(12) United States Patent
Sunarjo et al.

(10) Patent No.: US 11,769,263 B2
(45) Date of Patent: Sep. 26, 2023

(54) THREE-DIMENSIONAL SCAN REGISTRATION WITH DEFORMABLE MODELS

(71) Applicant: QUALCOMM Incorporated, San Diego, CA (US)

(72) Inventors: Samuel Sunarjo, San Diego, CA (US); Gokce Dane, San Diego, CA (US); Ashar Ali, San Diego, CA (US); Upal Mahbub, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 17/144,102

(22) Filed: Jan. 7, 2021

(65) Prior Publication Data
US 2022/0215564 A1 Jul. 7, 2022

(51) Int. Cl.
*G06T 7/33* (2017.01)
*G06T 7/73* (2017.01)
(Continued)

(52) U.S. Cl.
CPC ............. *G06T 7/344* (2017.01); *G06T 7/75* (2017.01); *G06T 17/205* (2013.01); *G06T 19/20* (2013.01);
(Continued)

(58) Field of Classification Search
CPC .. G06T 7/344; G06T 7/70; G06T 7/73; G06T 7/75; G06T 7/77; G06T 17/205;
(Continued)

(56) References Cited

U.S. PATENT DOCUMENTS

| 2010/0111370 A1* | 5/2010 | Black | G06V 10/763 |
| | | | 705/26.1 |
| 2020/0160613 A1* | 5/2020 | Han | G06V 40/103 |

OTHER PUBLICATIONS

Baak, Andreas, et al. "A data-driven approach for real-time full body pose reconstruction from a depth camera." Consumer depth cameras for computer vision. Springer, London, 2013. 71-98. (Year: 2013).*

(Continued)

*Primary Examiner* — Diane M Wills
(74) *Attorney, Agent, or Firm* — QUALCOMM Incorporated

(57) ABSTRACT

Systems and techniques are provided for registering three-dimensional (3D) images to deformable models. An example method can include determining, based on an image of a target and associated depth information, a 3D mesh of the target; determining different sets of rotation and translation parameters based on modifications to rotation and translation parameters of the 3D mesh; generating, based on the different sets of rotation and translation parameters, different 3D meshes having different orientations, different poses, and/or different alignments relative to the target; determining different sets of model parameters associated with the different 3D meshes, based on modifications to the different sets of rotation and translation parameters; generating, based on the different sets of model parameters, different additional 3D meshes having different orientations, different poses, and/or different alignments relative to the target; and selecting a final 3D mesh of the target from the different additional 3D meshes.

30 Claims, 11 Drawing Sheets

(51) Int. Cl.
*G06T 17/20* (2006.01)
*G06T 19/20* (2011.01)

(52) U.S. Cl.
CPC ............... *G06T 2207/10028* (2013.01); *G06T 2219/2016* (2013.01)

(58) Field of Classification Search
CPC ........... G06T 19/20; G06T 2207/10028; G06T 2207/30196; G06T 2219/2016
See application file for complete search history.

(56) References Cited

OTHER PUBLICATIONS

Baek, Seungryul, Kwang In Kim, and Tae-Kyun Kim. "Pushing the envelope for rgb-based dense 3d hand pose estimation via neural rendering." Proceedings of the IEEE/CVF Conference on Computer Vision and Pattern Recognition. 2019. (Year: 2019).*

Choi H, Moon G, Lee KM (2020) Pose2mesh: Graph convolutional network for 3d human pose and mesh recovery from a 2d human pose. arXiv preprint arXiv: 2008. 09047 (Year: 2020).*

Bray M., et al., "Smart Particle Filtering for High-Dimensional Tracking", Computer Vision and Image Understanding, Academic Press, US, vol. 106, No. 1, Apr. 6, 2007, pp. 116-129, XP022020131, ISSN: 1077-3142, DOI: 10.1016/J.CVIU.2005.09.013, Abstract, Figures 2,9,10, Sections 2, 3, 4.2, 5.

Huang Z., et al., "Deep Volumetric Video from Very Sparse Multi-View Performance Capture", Oct. 6, 2018, Advances in Databases and Information Systems, [Lecture Notes in Computer Science, Lect. Notes Computer], Springer International Publishing, Cham, pp. 351-369, XP047497230, ISBN: 978-3-319-10403-4, [retrieved on Oct. 6, 2018], Abstract Figure 4, Section 6.2.

International Search Report and Written Opinion—PCT/US2021/073120—ISA/EPO—dated Apr. 21, 2022.

Romero J., et al., "Embodied Hands: Modeling and Capturing Hands and Bodies Together", ACM Transactions on Graphics, ACM, NY, US, vol. 36, No. 6, Nov. 20, 2017, pp. 1-17, XP058473836, ISSN: 0730-0301, DOI: 10.1145/3130800.3130883, Abstract, Figure 3, Sections 3.1, 3.2, 4.3.3.

Zhou X., et al., "Model-Based Deep Hand Pose Estimation", arxiv.org, Cornell University Library, 201 Olin Library Cornell University Ithaca, NY, 14853, 7 Pages, Jun. 22, 2016, XP080710099, Abstract Sections 3.1, 3.2.

* cited by examiner

820

---

DETERMINE, BASED ON AN IMAGE OF A TARGET AND DEPTH INFORMATION ASSOCIATED WITH THE IMAGE, A THREE-DIMENSIONAL (3D) MESH MODEL OF THE TARGET
822

---

GENERATE A SET OF MODIFIED 3D MESH MODELS BASED ON ONE OR MORE ESTIMATED LOSSES IN A PLURALITY OF ROTATION AND TRANSLATION PARAMETERS ASSOCIATED WITH THE 3D MESH MODEL AND/OR DIFFERENT INSTANCES OF THE 3D MESH MODEL
824

---

SELECT A FINAL 3D MESH MODEL OF THE TARGET FROM THE SET OF MODIFIED 3D MESH MODELS
826

FIG. 8B

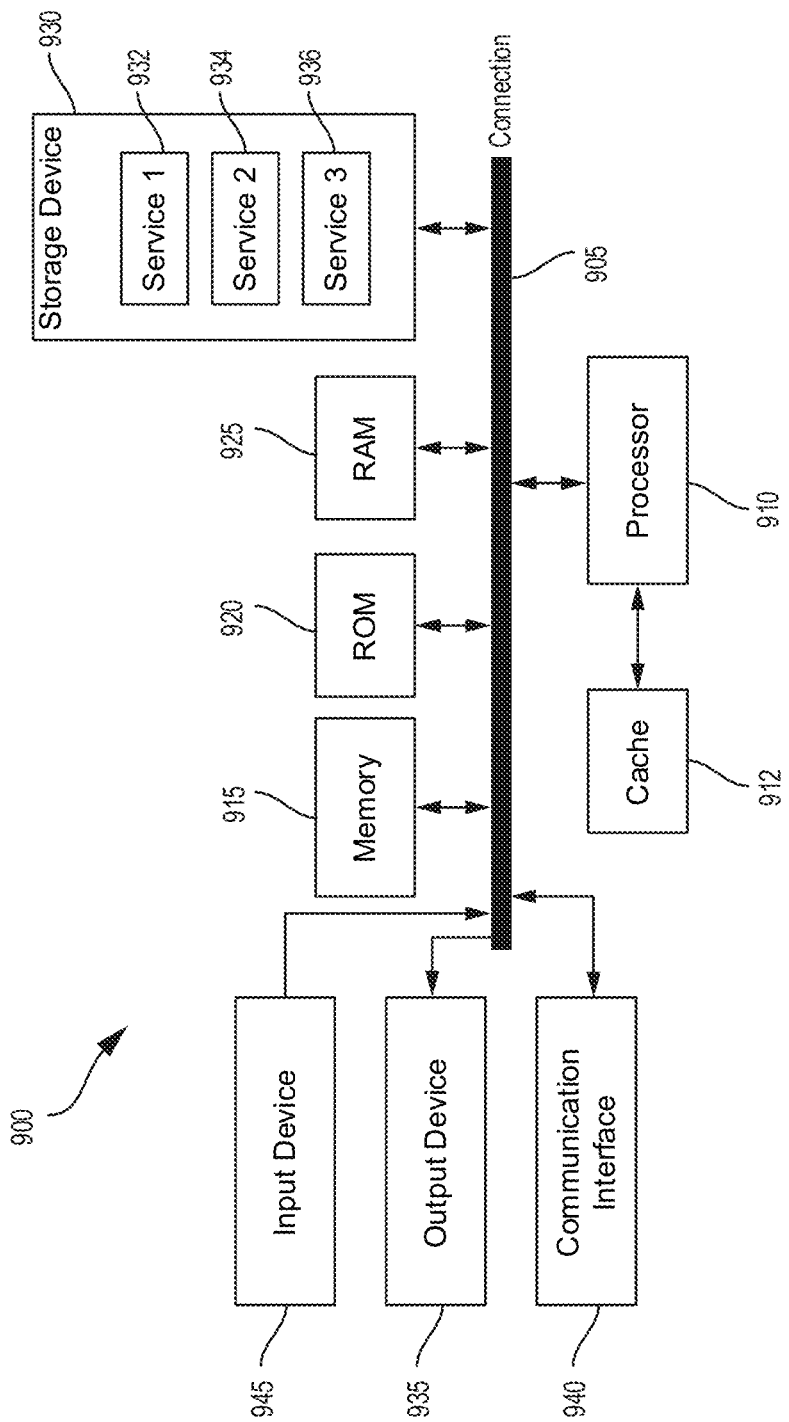

THREE-DIMENSIONAL SCAN REGISTRATION WITH DEFORMABLE MODELS

TECHNICAL FIELD

The present disclosure generally relates to image processing, and more specifically to techniques and systems for fitting deformable models to captured image data.

BACKGROUND

Many devices and systems are capable of generating images (or frames) and/or video data (including multiple frames) that capture scenes, objects, people, and shapes, among other things. For example, a camera or a computing device including a camera (e.g., a mobile device such as a mobile telephone or smart device including one or more cameras) can capture an image of a scene, a person, and/or an object. The image can be captured and processed by such devices and systems and output for consumption (e.g., displayed on a device). In some cases, the image can be captured and further processed for certain applications such as, for example, computer graphics, extended reality (e.g., augmented reality, virtual reality, and the like), image recognition (e.g., shape recognition, object recognition, scene recognition, etc.), and feature estimation, among others. For example, an image can be processed to detect any objects or faces (e.g., using face or object recognition, etc.) that are present in the image, which can be useful for various applications.

Some devices and systems with camera or imaging capabilities are also able to capture depth information associated with captured image or video data. For example, various three-dimensional (3D) scanners and multi-camera systems are able to capture 3D surfaces (e.g., 3D depth, shape, texture, etc.) of objects, people, and shapes. In some cases, the collected 3D data can be used to construct 3D models of targets (e.g., objects, people, shapes, etc.). The 3D models and/or collected 3D image data can be used in a variety of applications such as, for example, multimedia (e.g., movies, video games, extended reality, etc.), computer vision (e.g., motion tracking, shape modeling, object mapping, image recognition, pose estimation, image registration and warping, scene reconstruction, image segmentation, animation, etc.), robotics and automation, industrial design, and health care, among others. 3D modeling based on captured 3D image data can be challenging, particularly when modeling deformable shapes (e.g., shapes that can vary over time) or when the 3D image data can vary in size and/or is arbitrarily-sized. Moreover, 3D modeling technologies are often inaccurate and inconsistent, and have difficulty dealing with noise, ambiguities, and variations in 3D data.

BRIEF SUMMARY

In some examples, techniques and systems are described for three-dimensional (3D) image registration by fitting deformable models to 3D image data. According to at least one illustrative example, a method of 3D image registration with deformable models is provided. In some examples, the method can include determining, based on an image of a target and depth information associated with the image, a three-dimensional (3D) mesh model of the target; generating a set of modified 3D mesh models based on one or more estimated losses in a plurality of rotation and translation parameters associated with the 3D mesh model and/or different instances of the 3D mesh model; and selecting a final 3D mesh model of the target from the set of modified 3D mesh models.

According to at least one illustrative example, a non-transitory computer-readable medium is provided for 3D image registration with deformable models is provided. In some aspects, the non-transitory computer-readable medium can include instructions that, when executed by one or more processors, cause the one or more processors to determine, based on an image of a target and depth information associated with the image, a three-dimensional (3D) mesh model of the target; generate a set of modified 3D mesh models based on one or more estimated losses in a plurality of rotation and translation parameters associated with the 3D mesh model and/or different instances of the 3D mesh model; and select a final 3D mesh model of the target from the set of modified 3D mesh models.

According to at least one illustrative example, an apparatus is provided for 3D image registration with deformable models is provided. In some aspects, the apparatus can include memory having stored thereon computer-readable instructions and one or more processors configured to determine, based on an image of a target and depth information associated with the image, a three-dimensional (3D) mesh model of the target; generate a set of modified 3D mesh models based on one or more estimated losses in a plurality of rotation and translation parameters associated with the 3D mesh model and/or different instances of the 3D mesh model; and select a final 3D mesh model of the target from the set of modified 3D mesh models.

According to another illustrative example, an apparatus for 3D image registration with deformable models can include means for determining, based on an image of a target and depth information associated with the image, a three-dimensional (3D) mesh model of the target; generating a set of modified 3D mesh models based on one or more estimated losses in a plurality of rotation and translation parameters associated with the 3D mesh model and/or different instances of the 3D mesh model; and selecting a final 3D mesh model of the target from the set of modified 3D mesh models.

In some aspects, the method, apparatuses, and computer-readable medium described above can include determining different sets of adjusted rotation and translation parameters based on an estimated loss from the one or more estimated losses and/or modifications to rotation and translation parameters from the plurality of rotation and translation parameters, the rotation and translation parameters corresponding to the 3D mesh model; and generating different 3D mesh models based on the different sets of adjusted rotation and translation parameters, wherein the different 3D mesh models can include the different instances of the 3D mesh model, and the different 3D mesh models can have different orientations, different poses, and/or different alignments relative to the target in the image.

In some aspects, the method, apparatuses, and computer-readable medium described above can include determining different sets of model parameters associated with the different 3D mesh models, the different sets of model parameters being based on modifications to the different sets of adjusted rotation and translation parameters. In some examples, the set of modified 3D mesh models can be generated based on the different sets of model parameters associated with the different 3D mesh models.

In some examples, the estimated loss from the one or more estimated losses can be determined by determining, for each vertex in a 3D point cloud associated with the image and the depth information, a shortest distance of each vertex in the 3D point cloud to a surface formed by the 3D mesh model; determining a scan-to-mesh distance based on an average of the shortest distance of each vertex in the 3D point cloud; determining, for each vertex in the 3D mesh model, a shortest distance of each vertex in the 3D mesh model to a surface formed by the 3D point cloud; and determining a mesh-to-scan distance based on an average of the shortest distance of each vertex in the 3D mesh model.

In some aspects, the method, apparatuses, and computer-readable medium described above can include determining, based on the different sets of adjusted rotation and translation parameters, different orientations of the 3D mesh model, different poses of the 3D mesh model, and/or different alignments of the 3D mesh model relative to the target in the image; and generating the different 3D mesh models, each of the different 3D mesh models including a different orientation from the different orientations, a different pose from the different poses, and/or a different alignment from the different alignments.

In some examples, the set of modified 3D mesh models is generated based on different sets of model parameters associated with the different instances of the 3D mesh model, and each set of model parameters from the different sets of model parameters can include different rotation parameters, different translation parameters, different pose parameters, and/or different shape parameters. In some cases, each set of model parameters of the different sets of model parameters can be determined based on an estimated loss of the one or more estimated losses calculated for a set of adjusted rotation and translation parameters from different sets of adjusted rotation and translation parameters associated with the 3D mesh model. In some examples, the different sets of adjusted rotation and translation parameters can be based on modifications to rotation and translation parameters of the 3D mesh model.

In some cases, the estimated loss can be based on a scan-to-mesh distance calculated for a respective 3D mesh model of the different instances of the 3D mesh model, a mesh-to-scan distance calculated for the respective 3D mesh model, a physical constraint loss, a pose prior loss, a pose regularization loss, and/or a shape regularization loss. In some cases, the scan-to-mesh distance can include a first average distance determined based on a shortest distance of each vertex in a 3D point cloud associated with the image and the depth information to a first surface formed by the respective 3D mesh model, and the mesh-to-scan distance can include a second average distance determined based on a shortest distance of each vertex in the respective 3D mesh model to a second surface formed by the 3D point cloud.

In some cases, the physical constraint loss can be determined based on a range of pose parameters and/or shape parameters, and the pose regularization loss and/or the shape regularization loss can be proportional to a magnitude of the pose parameters and/or the shape parameters. In some cases, the pose prior loss can be based on a probability score indicating a likelihood of a pose.

In some examples, the final 3D mesh model is selected based on a respective distance between a 3D point cloud associated with the image and the depth information and each particular 3D mesh model from the set of modified 3D mesh models. In some cases, the respective distance can include a respective scan-to-mesh distance, wherein the respective scan-to-mesh distance includes an average distance determined based on a shortest distance of each vertex in the 3D point cloud to a surface formed by a particular 3D mesh model, and the final 3D mesh model includes the particular 3D mesh model having a shortest scan-to-mesh distance.

In some examples, the image and the depth information can include a 3D image and/or a 3D scan, the final 3D mesh model can include a deformable model, and the target can include a deformable object and/or a deformable body.

In some examples, selecting the final 3D mesh model can include aligning and/or fitting the final 3D mesh model to a 3D point cloud from the image and the depth information, the 3D point cloud corresponding to the target.

In some aspects, the method, apparatuses, and computer-readable medium described above can include generating the different instances of the 3D mesh model, wherein the plurality of rotation and translation parameters corresponds to the different instances of the 3D mesh model, and the set of modified 3D mesh models is generated based on modifications to the plurality of rotation and translation parameters of the different instances of the 3D mesh models.

In some aspects, an apparatus can be, or can be part of, a camera (e.g., an IP camera), a mobile device (e.g., a mobile telephone or so-called "smartphone," or other mobile device), a smart wearable device, an extended reality device (e.g., a virtual reality (VR) device, an augmented reality (AR) device, or a mixed reality (MR) device), a personal computer, a laptop computer, a server computer, a 3D scanner, a multi-camera system, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIGS. 8A and 8B are flowcharts illustrating example methods for 3D image registration with deformable models, in accordance with some examples of the present disclosure; and FIG. 9 is a diagram illustrating an example system architecture for implementing certain aspects described herein.

DETAILED DESCRIPTION

Figure 1:
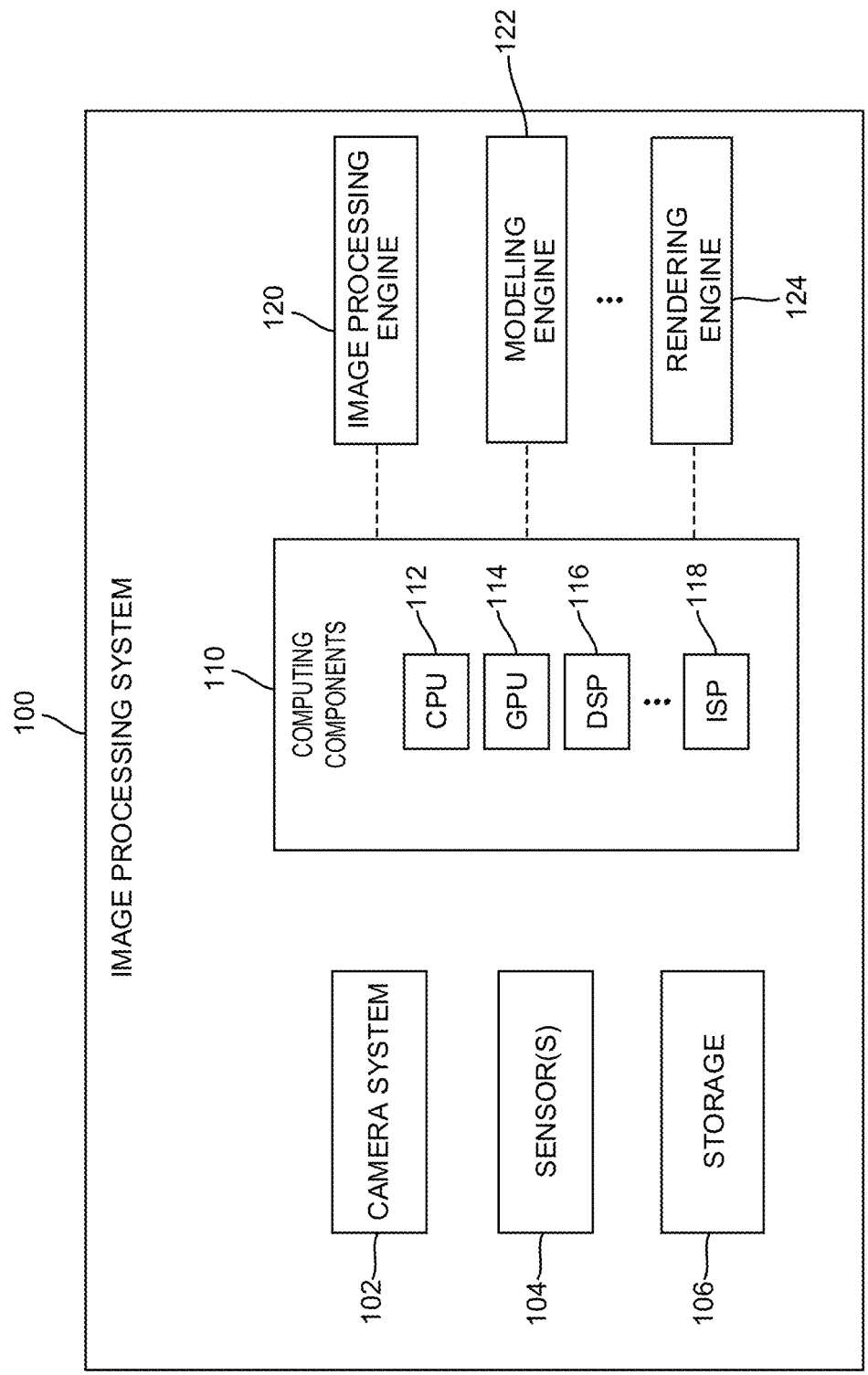
FIG. 1 is a simplified block diagram illustrating an example image processing system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously noted, some devices and systems with camera and/or imaging capabilities are able to capture image data and depth information associated with the image data. For example, three-dimensional (3D) scanners and certain multi-camera systems are able to capture 3D images or scans. The 3D images or scans can capture 3D surfaces (e.g., 3D depth, shape, texture, etc.) of objects, people, and shapes. In some cases, the collected 3D data can be used to construct 3D models of targets (e.g., objects, people, shapes, etc.). The 3D models and/or collected 3D image data can be used in a variety of applications such as, for example, multimedia (e.g., movies, video games, extended reality, etc.), computer vision (e.g., motion tracking, shape modeling, object mapping, image recognition, pose estimation, image registration and warping, scene reconstruction, image segmentation, animation, etc.), robotics and automation, industrial design, and health care, among others.

3D modeling based on captured 3D image data can be challenging, particularly when modeling deformable objects or when the 3D image data can vary in size and/or is arbitrarily-sized. Deformable objects can include non-rigid objects having articulations (e.g., joints, parts that can move relative to other parts, etc.) and/or components with independent degrees of freedom between any components. For example, a deformable object can include a non-rigid object with a mesh structure where the underlying skeleton or frame can articulate, such as a body or a manipulation robot. Deformable objects can be modeled using deformable models. In some examples, a deformable model can include a parametrized model that outputs a fixed-sized, ordered mesh. The model's input parameters can control the pose and shape of the mesh.

Registering 3D image data, such as a raw 3D point cloud or scan, with a 3D deformable object model can be very difficult. For example, fitting a parameterized, deformable model based on 3D image data, such as a 3D point cloud scan (e.g., an arbitrarily-sized, unordered set of vertices captured by a capturing system), can be a challenging procedure used to register captured 3D image data into accurate and/or well-defined meshes. The fitting procedure can suffer from various factors such as, for example, noise in the 3D image data, alignment ambiguities which can result in misalignment between the model and the 3D image data, poor surface textures in the 3D image data (and/or the target captured in the 3D image data), a wide variance in poses and shapes of the target to be modeled, variation and/or unpredictability in the size of vertices in the 3D image data, among other factors. Forming a dataset to train and benchmark algorithms for estimating deformable outputs based on visual inputs (e.g., 3D image data) can also be complex, and can add to the difficult of accurately fitting a deformable model based on 3D image data.

The various factors noted above can cause and/or exacerbate a local minima problem in model alignment. For example, a fitting procedure can become trapped in the local minima and/or can have difficulty finding the global minimum. Implementing a random initialization of model parameters prior to optimization is often ineffective in addressing the local minima problem in alignment. In many cases, it is more effective to instantiate multiple intermediate initializations when the aligning model is close to and/or partially aligned with the 3D image data.

According to some examples, the technologies and systems described herein can provide a multi-stage optimization process to deform a parameterized model and output a best fit mesh. For example, a process for fitting a parameterized, deformable model can include a multi-stage optimization process to deform the parameterized model and output a 3D mesh that best fits the input data based on a predetermined loss function. In some examples, a first stage of the multi-stage optimization process can optimize the global rotation and translation parameters. In some cases, the first stage of the multi-stage optimization process can maintain other model parameters constant. After the first stage, the model parameters can be manipulated to create multiple model instances (e.g., different mesh instantiations and/or registrations). In some examples, each of the model instances can have a different set of parameters. The parameters in each of the model instances can be optimized through a second optimization stage. A final or output mesh instance can then be selected from the optimized instances. For example, a final mesh instance with a minimal loss with respect to the 3D image data can be selected from the different, optimized registrations associated with the multiple instantiations.

In some cases, the final mesh instance selected can be the mesh instance having a minimum distance to the 3D image data. For example, the final mesh instance can be selected based on a scan-to-mesh distance and/or a mesh-to-scan distance. The scan-to-mesh distance can include a distance between each vertex in a point cloud associated with the 3D image data (e.g., a 3D point cloud scan) and the surface formed by the mesh estimated by the algorithm. The mesh-to-scan distance can include a distance between each vertex in the mesh estimated by the algorithm and the surface formed by the point cloud associated with the 3D image data (e.g., the 3D point cloud scan). In some examples, a loss function(s) implemented by the fitting procedure (e.g., the multi-stage optimization process) can include and/or can be based on a scan-to-mesh distance, a mesh-to-scan distance, a pose regularization (e.g., a norm regularization loss that enforces more accurate and/or realistic pose parameters), and/or a shape regularization (e.g., a norm regularization loss that enforces more accurate and/or realistic shape parameters). In some cases, the loss function(s) can optionally include a pose prior loss that penalizes poses determined to be unlikely (e.g., poses having a low probability).

In some examples, the technologies described herein can be applied effectively to 3D image data capturing subjects with complex articulation, such as a body (e.g., a human or animal body), a body part (e.g., a head, hands, legs, arms, etc.), an articulated robot or object, etc. The technologies described herein can adapt to any parameterized model and can apply to arbitrarily-sized image data (e.g., point clouds) from any capture device. In some cases, prior knowledge in a specific application domain can be used when designing instantiations. The loss function can be robust to noise and/or occlusions in the 3D image data. In some examples, the technologies described herein may not require learning from a large, annotated dataset. However, such a dataset can be used in some implementations. For example, such a dataset can be used to optionally implement a pose prior loss. In some cases, additional physical constraint can be derived and incorporated for the poses of the subject in the specific applications (e.g., joint rotation limitations and motion limitations in human or animal body, a body part, an object, etc.) in designing instantiations and the losses.

Examples of the systems and techniques described herein for 3D image registration with deformable models are illustrated in FIG. 1 through FIG. 9 and described below. FIG. 1 is a diagram illustrating an example image processing system 100. The image processing system 100 can perform 3D image registration with deformable models, as further described herein. Moreover, the image processing system 100 can perform various image processing tasks, effects, computations, etc., such as, for example, generating chroma keying effects, extended reality effects, image registration and warping, motion tracking, pose estimation, object mapping, feature extraction, image recognition (e.g., face recognition, expression recognition, gender recognition, eye gaze recognition, age estimation, race estimation, object recognition, etc.), tracking, automation, machine vision, object modeling and registration, and/or any other image processing tasks, effects, and/or computations.

In some illustrative examples, the image processing system 100 can perform 3D image registration with deformable models. The image processing system 100 can generate 3D mesh models of deformable objects captured in 3D image data (e.g., RGB-D images, 3D scans), optimize model parameters (e.g., rotation parameters, translation parameters, pose parameters, and/or shape parameters), generate different instances of the 3D models (e.g., rotated and/or manipulated instances), optimize model parameters associated with the different instances of the 3D models, and select an instance of a 3D model for the deformable object captured in the 3D image data. In some examples, the image processing system 100 can implement a multi-stage optimization and registration process as further described herein.

In the example shown in FIG. 1, the image processing system 100 includes a camera system 102, a storage 106, computing components 110, an image processing engine 120, a modeling engine 122, and a rendering engine 124. The image processing system 100 can also optionally include one or more additional sensors 104, such as an image sensor, a radar sensor, a light detection and ranging (LIDAR) sensor, an infrared (IR) sensor, etc.

The image processing system 100 can be part of a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a digital media player, a gaming console, a video streaming device, a drone, a computer in a car, an Internet-of-Things (IoT) device, or any other suitable electronic device(s).

In some implementations, the camera system 102, the sensor(s) 104, the storage 106, the computing components 110, the image processing engine 120, the modeling engine 122, and the rendering engine 124 can be part of the same computing device. For example, in some cases, the camera system 102, the sensor(s) 104, the storage 106, the computing components 110, the image processing engine 120, the modeling engine 122, and the rendering engine 124 can be integrated into a smartphone, laptop, tablet computer, smart wearable device, gaming system, server, and/or any other computing device. However, in some implementations, the camera system 102, the sensor(s) 104, the storage 106, the computing components 110, the image processing engine 120, the modeling engine 122, and/or the rendering engine 124 can be part of two or more separate computing devices.

The camera system 102 can include one or more image sensors capable of capturing images and associated depth information. For example, the camera system 102 can include one or more image sensors capable of capturing RGB-D images and/or 3D scans. In some examples, the camera system 102 can include one or more 3D scanners. In some examples, the camera system 102 can include one or more camera devices. In some cases, the camera system 102 can capture multi-view image data. In some examples, the camera system 102 can include a multi-camera system or scanner.

In some cases, the camera system 102 can include one or more image sensors (or image capture devices). The one or more image sensors can be any type of image sensor (or image capture devices) and/or video sensor (or video capture devices). For instance, the camera system 102 can include a digital camera sensor, a video camera sensor, a smartphone camera sensor, an image/video capture device included as part of an electronic apparatus (e.g., a television, a computer, a camera, etc.). In some cases, the camera system 102 can be part of a camera or computing device, such as a digital camera, a video camera, an IP camera, a smartphone, a smart television, a game system, a scanner, a multi-camera system, or other computing device. The camera system 102 can capture 3D image data and/or video content (e.g., raw image and/or video data). The 3D image data and/or video content can be processed by the computing components 110, the image processing engine 120, the modeling engine 122, and/or the rendering engine 124 as described herein.

The other sensor(s) 104 can be any sensor for detecting and measuring information such as distance, motion, position, depth, speed, etc. Non-limiting examples of other sensors 104 include LIDARs, gyroscopes, accelerometers, magnetometers, IR sensors, inertial measurement units (IMUs), radar sensors, machine vision sensors, etc. In some cases, the image processing system 100 can include other sensors, such as a smart scene sensor, a speech recognition sensor, an impact sensor, a position sensor, a tilt sensor, a light sensor, etc.

The storage 106 can be any storage device(s) for storing data, such as image or video data for example. Moreover, the storage 106 can store data from any of the components of the image processing system 100. For example, the storage 106 can store data or measurements from the camera system 102, the other sensor(s) 104, the computing components 110 (e.g., processing parameters, outputs, generated images, calculation results, models, etc.), and/or data from any of the image processing engine 120, the modeling engine 122, and/or the rendering engine 124 (e.g., output images, processing results, models, etc.). In some examples, the storage 106 can include a buffer for storing data (e.g., image data) for processing by the computing components 110.

In some implementations, the computing components 110 can include a central processing unit (CPU) 112, a graphics processing unit (GPU) 114, a digital signal processor (DSP) 116, and/or an image signal processor (ISP) 118. The computing components 110 can perform various operations such as image enhancement, object or image segmentation, computer vision, graphics rendering, augmented reality, image/video processing, sensor processing, recognition (e.g., text recognition, object recognition, feature recognition, face recognition, facial expression recognition, eye gaze recognition, age recognition, gender recognition, race recognition, tracking or pattern recognition, scene change recognition, etc.), disparity detection, machine learning, filtering, face augmentation, face analytics, facial rendering, and any of the various operations described herein. In some examples, the computing components 110 can implement the image processing engine 120, the modeling engine 122, and the rendering engine 124. In other examples, the computing components 110 can also implement one or more other processing engines.

Moreover, the operations for the image processing engine 120, the modeling engine 122, and the rendering engine 124 can be implemented by one or more of the computing components 110. In one illustrative example, the image processing engine 120 and the modeling engine 122 (and associated operations) can be implemented by the CPU 112, the DSP 116, and/or the ISP 118, and the rendering engine 124 (and associated operations) can be implemented by the GPU 114. In some cases, the computing components 110 can include other electronic circuits or hardware, computer software, firmware, or any combination thereof, to perform any of the various operations described herein.

In some cases, the computing components 110 can receive data (e.g., image data, video data, etc.) captured by the camera system 102 and generate, optimize, and fit 3D mesh models to the data. For example, the computing components 110 can receive 3D image data captured by the camera system 102, detect a deformable object in the 3D image data, generate a 3D mesh model of the deformable object, optimize parameters of the 3D mesh model, generate different instances of the 3D mesh model, optimize parameters of the different instances of the 3D mesh model, generate additional 3D mesh model instances, optimize parameters of the additional 3D mesh model instances, and select a 3D mesh model instance as a final mesh model for the deformable object. An image (or frame) can include a red-green-blue (RGB) image or frame having red, green, and blue color components per pixel; a luma, chroma-red, chroma-blue (YCbCr) image or frame having a luma component and two chroma (color) components (chroma-red and chroma-blue) per pixel; or any other suitable type of color or monochrome picture. An image can also include an RGB depth (RGB-D) image or a 3D scan image.

The computing components 110 can implement the image processing engine 120 and the modeling engine 122 to perform various image processing operations, such as object modeling, model optimization, fitting mesh models to 3D image data, object tracking, XR rendering, etc. For example, the computing components 110 can implement the image processing engine 120 and the modeling engine 122 to perform 3D image registration with deformable models, as further described herein. The computing components 110 can process image data captured by the camera system 102 and/or, the other sensor(s) 104, image data stored in the storage 106, image data received from a remote source (e.g., a remote camera, a server, a content provider, any combination thereof, and/or other remote source), image data obtained from a combination of sources, any combination thereof, and/or other image data.

In some examples, the modeling engine 122 can include (e.g., can implement, can contain, etc.) one or more models. For example, in some cases, the modeling engine 122 can include one or more skinning models, as further described herein. In some cases, the modeling engine 122 can include an optimization system, as described herein. In some examples, the modeling engine 122 can implement any other models, such as any type of statistical models, neural network models, etc.

In some examples, the rendering engine 124 can receive output image data from the computing components 110 and render the output image data for presentation on a display device such as, for example, a screen/display, a television, a projector, etc. In some examples, the rendering engine 124 can receive generated images and/or mesh models from the image processing engine 120 and/or the modeling engine 122 and render the images and/or mesh models.

While the image processing system 100 is shown to include certain components, one of ordinary skill will appreciate that the image processing system 100 can include more or fewer components than those shown in FIG. 1. For example, the image processing system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the image processing system 100 is described below with respect to FIG. 9.

Figure 2:
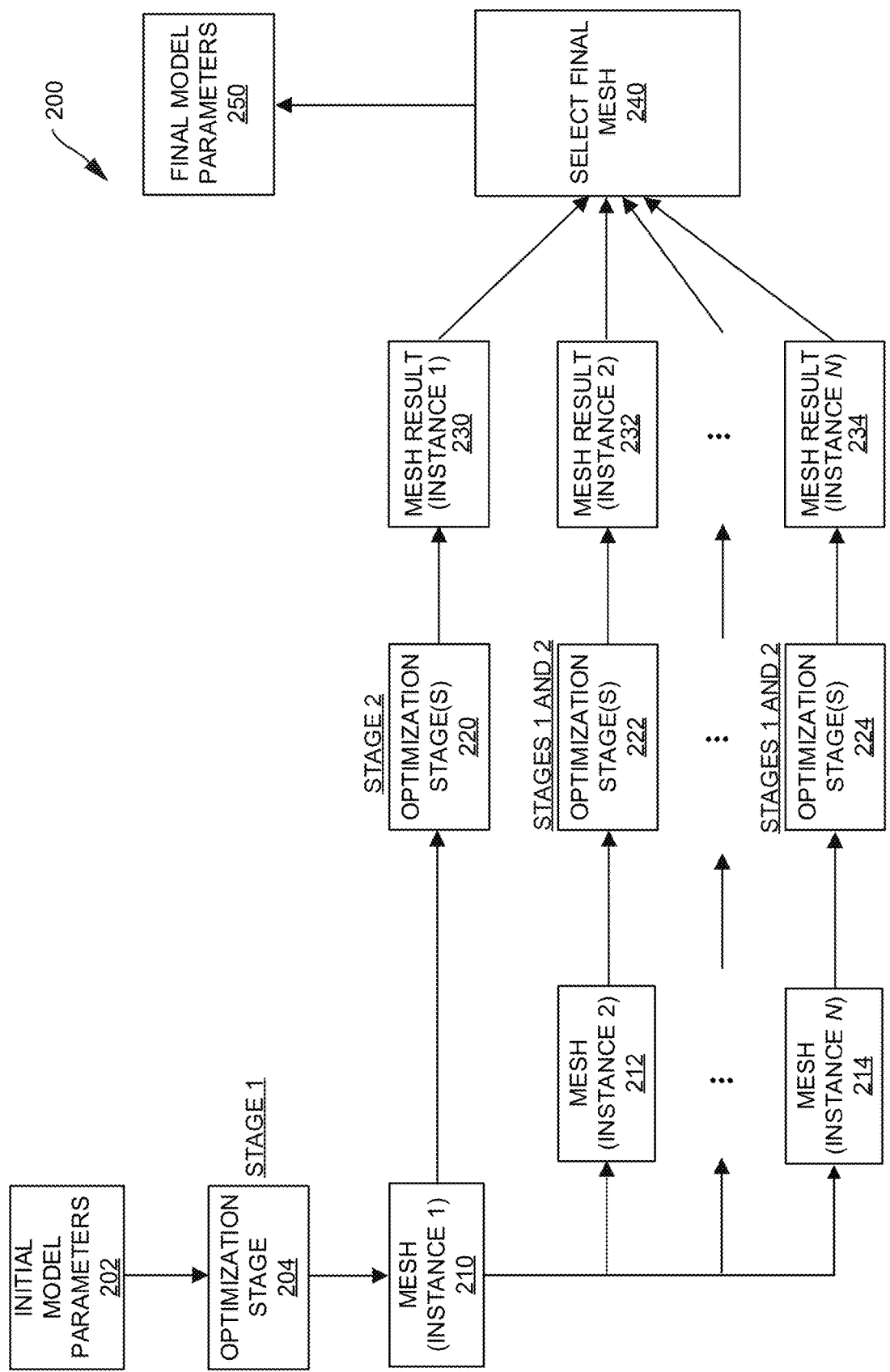
FIG. 2 is a diagram illustrating an example registration process for registering three-dimensional (3D) image data into a 3D mesh, in accordance with some examples of the present disclosure.

FIG. 2 is a diagram illustrating an example registration process 200 for registering 3D image data into a 3D mesh. The 3D image data can include image data and associated depth information corresponding to a deformable object captured by the 3D image data. A deformable object can include a non-rigid system (e.g., a non-rigid body, body part, object, etc.) with a structure that can articulate (e.g., move, rotate, etc.). For example, a deformable object can include an articulated object. An articulated object can include at least two components with up to six degrees of freedom between any of them. To illustrate, an articulated object can include a structure with one or more joints or articulations (or articular surfaces) that allow one or more components (e.g., parts, portions, sub-structures, etc.) of the structure to move relative to a different component(s) of the structure and/or provide a certain freedom of movement (e.g., rotational, translational, etc.) between any components of the structure. Non-limiting examples of deformable objects can include a human, an animal, a body part, certain tools, manipulation robots, etc.

The 3D mesh can include a deformable model of the deformable object captured by the 3D image data. The deformable model can include a parametrized model that outputs a fixed-sized, ordered mesh based on input parameters controlling one or more aspects of the mesh, such as a pose of the mesh and a shape of the mesh. In some examples, the deformable model (e.g., the 3D mesh) can have a fixed, finite number of parameters that describe the articulation of the mesh, the orientation of the mesh, the translation of the mesh, and 3D coordinates of the mesh.

The 3D image data can be captured by one or more capturing devices configured to capture image data and associated depth information. For example, the 3D image data can be captured by the camera system 102 shown in FIG. 1. The 3D image data can include, for example, a red-green-blue (RGB) depth (RGB-D) image, a 3D scan, a 3D point cloud associated with an RGB-D image or 3D scan, and the like.

Figure 3A:
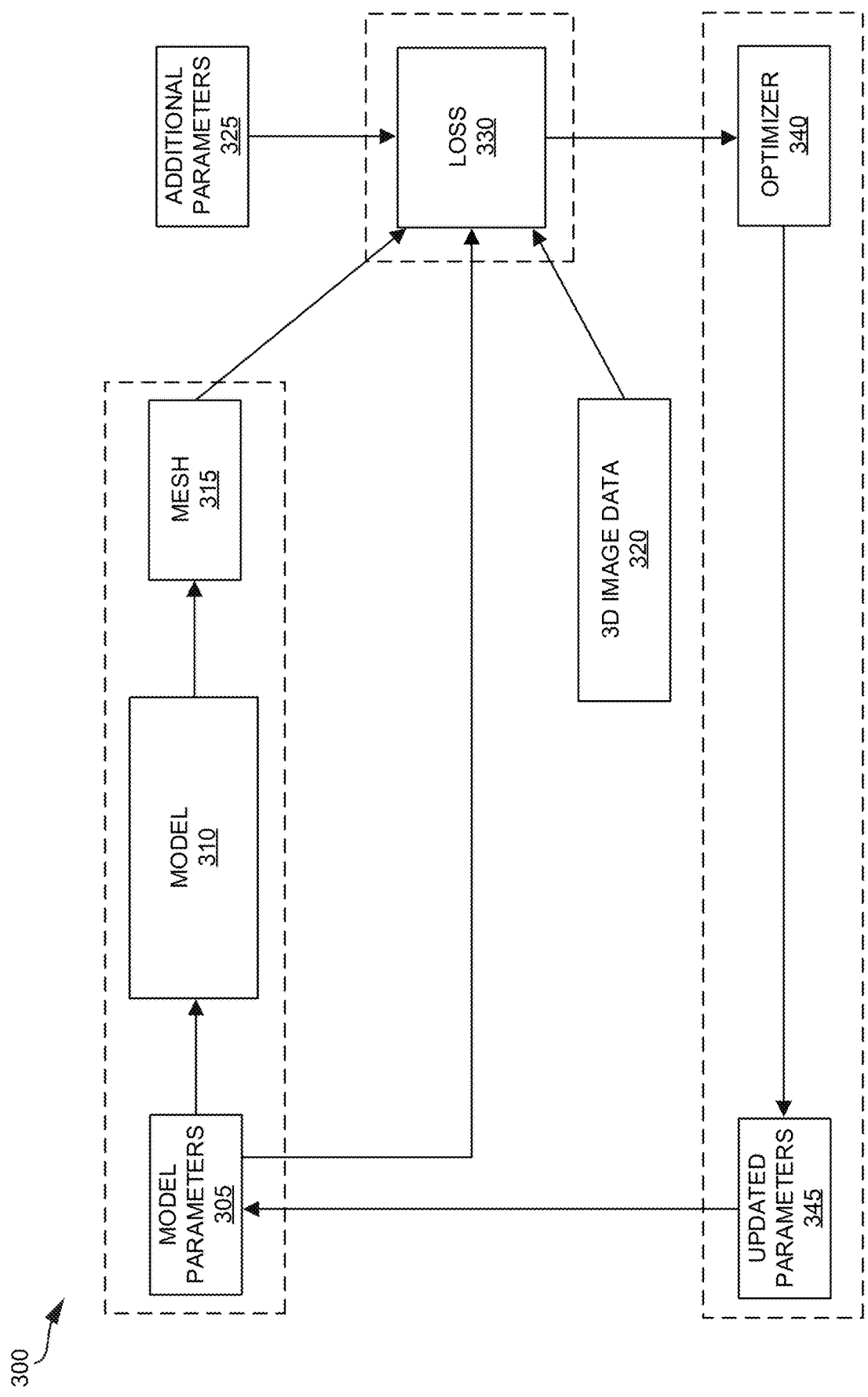
FIGS. 3A and 3B are diagrams illustrating example optimization systems for performing multi-stage optimizations in a registration process, in accordance with some examples of the present disclosure.
Figure 3B:
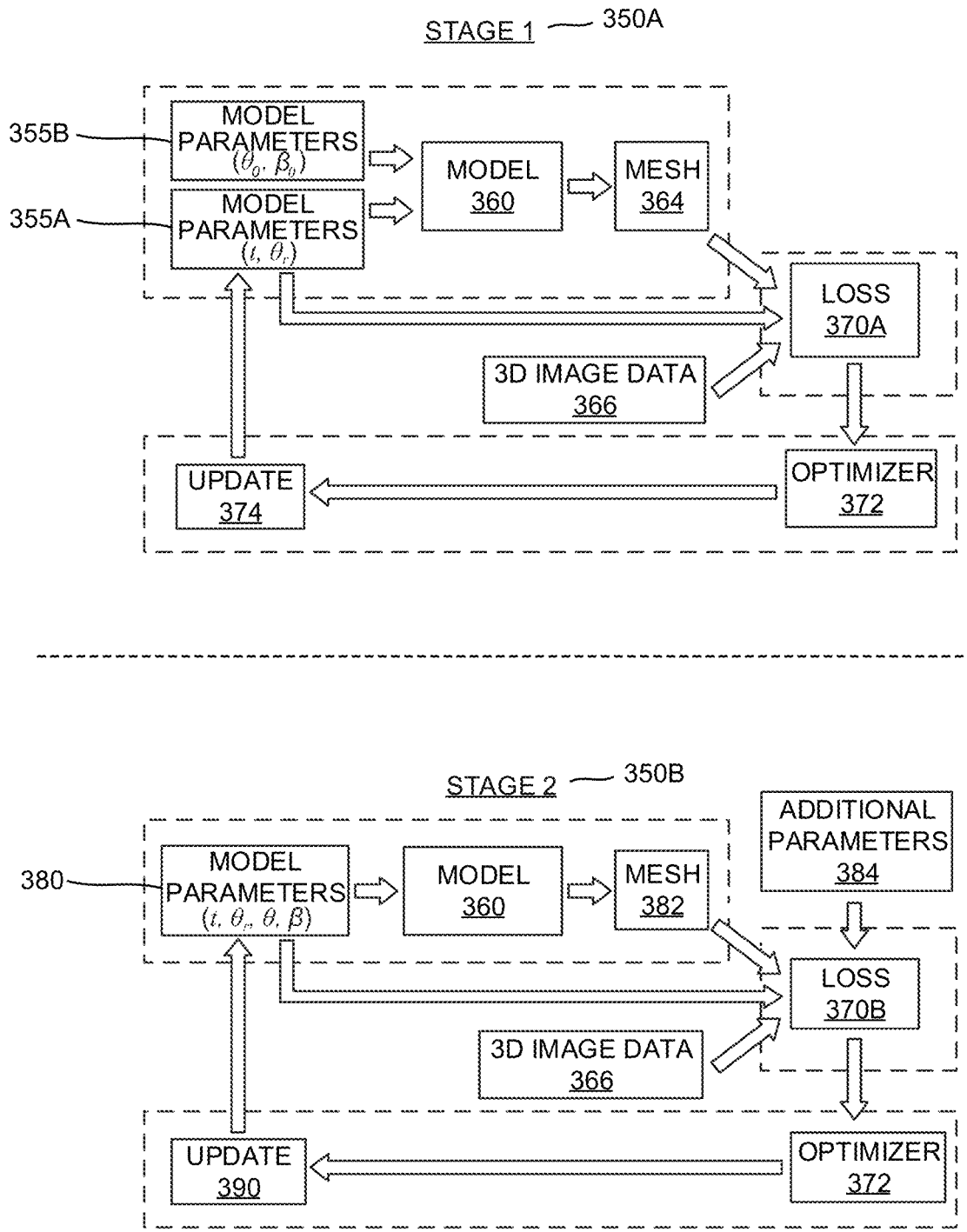

The registration process 200 can fit a parametrized, deformable model (e.g., the 3D mesh) to the 3D image data. In some examples, the registration process 200 can perform fitting and optimization to register, or align, a 3D mesh to the 3D image data. As shown in the example registration process 200, the image processing system 100 can use initial model parameters 202 to perform a first optimization stage 204 to initialize a 3D mesh and optimize model parameters. To perform the first optimization stage 204, the image processing system 100 implement an optimization system, as shown in FIGS. 3A and 3B and further described below.

The initial model parameters 202 can include rotation parameters, translation parameters, shape parameters, and pose parameters for a 3D mesh. At the first optimization stage 204, the image processing system 100 can use the initial model parameters 202 to generate a 3D mesh representing a deformable object captured in the 3D image data. At the first optimization stage 204, the image processing system 100 can then optimize rotation and translation parameters associated with the 3D mesh. In some cases, the first optimization stage 204 can optimize global rotation and translation parameters but maintain other model parameters constant.

The first optimization stage 204 can optimize the rotation and translation parameters based on a loss function and the 3D image data. The first optimization stage 204 including the loss function are further described below with respect to FIGS. 3A and 3B.

After the optimization stage 204, the image processing system 100 can rotate the 3D mesh previously generated to generate different mesh instances 210, 212, 214 having different rotation and/or translation parameters. The image processing system 100 can generate the mesh instances 210, 212, 214 based on the model parameters, including respective optimized parameters. In some examples, the image processing system 100 can manipulate the 3D mesh in different ways to generate mesh instances with different poses (e.g., mesh instances 210, 212, 214).

The image processing system 100 can apply a second optimization stage 220 to the mesh instance 210 to generate a mesh result 230 based on the mesh instance 210. At the second optimization stage 220, the image processing system 100 can optimize at least some of the model parameters of the mesh instance 210. For example, the image processing system 100 can optimize the rotation and translation parameters of the mesh instance 210. In some cases, at the second optimization stage 220, the image processing system 100 can also optimize other model parameters, such as pose and/or shape parameters. The image processing system 100 can optimize the model parameters based on a loss function and the 3D image data. The second optimization stage 220 including the loss function are further described below with respect to FIGS. 3A and 3B.

In some examples, the mesh result 230 can have a modified pose relative to the mesh instance 210 and/or a modified alignment with the 3D image data relative to an alignment of the mesh instance 210 to the 3D image data. The image processing system 100 can use the mesh result 230 as a candidate mesh when selecting a final mesh for the 3D image data.

The image processing system 100 can apply optimization stages 222 to the mesh instance 212, and optimization stages 224 to the mesh instance 214. The optimization stages 222 can include a first optimization stage and a second optimization stage, as previously described. Similarly, the optimization stages 224 can include a first optimization stage and a second optimization stage. The image processing system 100 can apply a first optimization stage to the mesh instance 212 and the mesh instance 214 to better align and/or otherwise manipulate (e.g., adjust a pose, etc.) the mesh instance 212 and the mesh instance 214. The image processing system 100 can apply the second optimization stage to the mesh instance 212 and the mesh instance 214 to again optimize their respective model parameters and generate a mesh result for the mesh instance 212 and the mesh instance 214.

After the optimization stages 222 and 224, the image processing system 100 can generate or output a mesh result 232 for the mesh instance 212 and a mesh result 234 for the mesh instance 214. The mesh result 232 and the mesh result 234 can be used as additional candidates for a final mesh. The image processing system 100 can select a final mesh 240 based on the mesh result 230, the mesh result 232, and the mesh result 234.

To select the final mesh 240, the image processing system 100 can compute for each mesh result a distance between the mesh result and the 3D image data and select the mesh result with the minimum distance. For example, in some cases, the image processing system 100 can calculate a scan-to-mesh distance for the mesh result 230, the mesh result 232, and the mesh result 234. The image processing system 100 can then select the mesh result having the minimum distance or the minimum average distance as the final mesh 240.

In some examples, to calculate a scan-to-mesh distance for a mesh instance, the image processing system 100 can calculate, for each vertex or point in the 3D image data (e.g., each vertex in a 3D point cloud associated with the 3D image data), the shortest distance to the surface formed by the vertices of the mesh instance, and average the calculated distances for all the vertices or points in the 3D image data to generate the scan-to-mesh distance. The image processing system 100 can then compare the scan-to-mesh distances calculated for the mesh result 230, the mesh result 232, and the mesh result 234 and select the mesh result with the shortest distance as the final mesh 240. The image processing system 100 can determine the final model parameters 250 based on the selected final mesh 240.

In some examples, the image processing system 100 can calculate the scan-to-mesh distance (e.g., the scan vertex to mesh surface distance) based on Equation 1 as follows:

$$E_{g'}(\vec{\beta}, \vec{\theta}; S) = \sum\nolimits_{s \in S} \rho \left( \min_{m \in M(\vec{\beta}, \vec{\theta})} \|s - m\| \right) \qquad \text{Equation (1)}$$

where S denotes the scan vertices (e.g., the vertices of the 3D image data), β denotes shape parameters, θ denotes pose parameters, $M(\vec{\beta}, \vec{\theta})$ denotes the surface formed by the vertices of the mesh, and ρ denotes an error function, such as a German-McClure robust error function.

FIG. 3A is a diagram illustrating an example optimization system 300 for implementing optimization stages and generating 3D meshes as previously described with respect to FIG. 2. The optimization system 300 can be iteratively implemented during first optimization stage, a second optimization stage, and/or any other optimization stages.

In this example, the model 310 can generate a 3D mesh 315 based on input model parameters 305. The 3D mesh 315 can include a deformable model of a deformable object captured in the 3D image data 320. The model parameters 305 can control the pose and shape of the 3D mesh 315. In some examples, the model parameters 305 can include rotation parameters, translation parameters, pose parameters, and shape parameters. In some cases, if the model parameters 305 are part of a first optimization stage, the model parameters 305 can include the initial model parameters for an initialized 3D mesh. If the model parameters 305 are part of a second optimization stage, the model parameters 305 can include one or more optimized model parameters.

In some examples, the model 310 can be implemented by the modeling engine 122 shown in FIG. 1. The model 310 can include a deformable model. In some examples, the model 310 can include a skinning model. An illustrative example of a skinning model includes a hand model with articulated and non-rigid deformations or MANO model, as described in Javier Romero et al., "Embodied Hands: Modeling and Capturing Hands and Bodies Together", *ACM Transactions on Graphics*, Vol. 36, No. 6, Article 245 (November 2017), which is hereby incorporated by reference in its entirety and for all purposes.

The optimization system 300 can then calculate a loss 330 based on the 3D image data 320 and at least some of the model parameters 305 associated with the 3D mesh 315. In some examples, on a first optimization stage, the model parameters used to determine the loss 330 can include the rotation and translation parameters. In other examples, on a second optimization stage, the model parameters used to determine the loss 330 can include the rotation and translation parameters, as well as any other parameters, such as pose and shape parameters. In some examples, the loss 330 can be determined using additional parameters 325.

In some cases, the additional parameters 325 can be implemented at a second (and/or additional) optimization stage. In some examples, the additional parameters 325 can include domain-specific parameters. For example, in a hand modeling use case, the additional parameters 325 can include an articulation or rotation range (and/or maximum) for one or more joints in the hand, a size range (and/or maximum) of the hand and/or finger, etc. An articulation or rotation range can exclude an amount or degree of joint articulation or rotation determined to be physically impossible or improbable. The articulation or rotation range can be used to penalize unlikely articulations or rotations. The size range of the hand and/or finger can exclude hand and/or finger sizes that exceed the maximum size possible or probable for the type of hand and/or finger (e.g., a human hand and/or finger, a specific animal hand and/or finger, etc.). The size range can be used to penalize unlikely hand and/or finger sizes.

In some examples, the additional parameters 325 can include Gaussian distribution parameters (e.g., mean and covariance) for a pose prior loss (e.g., a probabilistic loss that penalizes unlikely poses). In some cases, the additional parameters 325 can be camera intrinsic or camera extrinsic, depending on whether the 3D image data 320 includes camera image data or multi-view image data.

In some examples, the loss 330 can be determined based on a scan-to-mesh distance and/or a mesh-to-scan distance calculated based on the 3D mesh 315 and the 3D image data 320. In some cases, the scan-to-mesh distance can be calculated based on Equation (1), previously described. In some cases, the mesh-to-scan distance can be determined by calculating, for each vertex in the 3D mesh 315, the shortest distance to the surface formed by the 3D image data 320, and calculating an average of the distances for all vertices or points of the 3D mesh 315. In some examples, the mesh-to-scan distance can be calculated according to Equation (2) below:

$$E_{g'}(\vec{\beta}, \vec{\theta}; S) = \sum\nolimits_{m \in M(\vec{\beta}, \vec{\theta})} \rho \left( \min_{s \in C} \|s - m\| \right) \qquad \text{Equation (2)}$$

where C denotes the surface formed by the vertices of the scan (e.g., the 3D image data 320), β denotes shape parameters, θ denotes pose parameters, $M(\vec{\beta}, \vec{\theta})$ denotes the vertices of the 3D mesh 315, and ρ denotes an error function, such as a German-McClure robust error function.

In some examples, in a first optimization stage, the loss 330 can be based on both a determined scan-to-mesh distance and a mesh-to-scan distance. In some cases, in a second (or additional) optimization stage, the loss 330 can be based on a determined scan-to-mesh distance, a mesh-to-scan distance, as well as other losses. For example, in a second (or additional) optimization stage, the loss 330 can be based on a scan-to-mesh distance, a mesh-to-scan distance and a physical constraint loss, a pose/shape regularization, and/or a pose prior loss.

The physical constraint loss can penalize when the pose parameters of the 3D mesh 315 exceed a defined range (e.g., a maximum and minimum range) to discourage the pose parameters from exceeding physical constraints. An example physical constraint loss can be as follows:

$$E_p(\vec{\theta}) = \max(\vec{\theta} - \vec{\theta}_{max}, 0) + \max(\vec{\theta}_{min} - \vec{\theta}, 0) \qquad \text{Equation (3)}$$

The pose regularization can include a norm regularization loss that enforces more realistic or probable poses, and a shape regularization can be a norm regularization loss that enforces more realistic or probable shapes. An example norm regularization loss can be as follows:

$$E_\theta(\vec{\theta}) = \|\vec{\theta}\|^2 \text{ and/or } E_\beta(\vec{\beta}) = \|\vec{\beta}\|^2 \qquad \text{Equation (4)}$$

The pose prior loss can include a probabilistic loss that penalizes unlikely poses. In some examples, the likelihood value can be calculated by passing the pose parameters through a learned Multivariate Gaussian distribution. The Gaussian distribution parameters (e.g., mean and covariance) can be learned/estimated from existing scans with registered pose parameters. The existing scans can include scans of the object captured by the 3D image data 320. A negative log likelihood value can be processed further with a sigmoid function to produce a probability score indicating the likelihood that the pose parameters are realistic. An example pose prior loss can be as follows:

$$L_\theta = \sigma(-\log(N(\theta \mu_\theta, \Sigma_\theta)))$$  Equation (5)

where $\sigma$ is a sigmoid function, N is a normal distribution, $\mu_\theta$ is a pose mean, and $\Sigma_\theta$ is a pose covariance. The physical constraint loss, pose/shape regularization, and pose prior loss described above can vary and/or depend on the specific use case and/or domain. For example, in certain use cases and/or domains, physical constraint loss, pose/shape regularization, and pose prior loss described above can be designed and/or implemented different than in the illustrative examples above.

Once the loss 330 has been calculated, an optimizer 340 can use the loss 330 to generate updated parameters 345. The updated parameters 345 can include optimized rotation and translation parameters. In some cases, on second (or additional) optimization stages, the updated parameters 345 can include other optimized model parameters, such as pose and/or shape parameters. In some cases, the optimizer 340 can be a second order optimizer. In some examples, the optimizer 340 can implement an iterative method for solving unconstrained nonlinear optimization problems. For example, the optimizer 340 can implement a Broyden-Fletcher-Goldfarb-Shanno (BFGS) algorithm or a limited-memory BFGS (L-BFGS) algorithm.

In some examples, the updated parameters 345 can be used to update the model parameters 305 and/or can be input into the model 310 (e.g., alone or in combination with other model parameters) to perform another optimization iteration for generating a mesh, determining a loss, and generating updated parameters. The optimization system 300 can implement n number of iterations as part of an optimization stage. In some examples, the optimization system 300 can implement multiple optimization stages and can implement n number of iterations for each optimization stage.

FIG. 3B is a diagram illustrating an example multi-stage implementation of an example optimization system, such as the optimization system 300 shown in FIG. 3A. In this example, the optimization system implements a first optimization stage 350A and a second optimization stage 350B, with each optimization stage including one or more iterations.

At the first optimization stage 350A, initial model parameters 355A and 355B are input into the model 360 to generate a mesh 364. In some examples, the model 360 can be implemented by the modeling engine 122 shown in FIG. 1. The model 360 can include a deformable model. In some examples, the model 360 can include a skinning model, such as a MANO model. The model 360 can generate the mesh 364 based on initial model parameters 355A and 355B.

The mesh 364 can include a deformable model of a deformable object captured in the input 3D image data 366. The model parameters 355A and 355B can control the pose and shape of the mesh 364. In some examples, the model parameters 355A and 355B can include rotation parameters, translation parameters, pose parameters, and shape parameters. For example, the model parameters 355A can include translation and rotation parameters, and the model parameters 355B can include pose and shape parameters.

The translation and rotation parameters from the mesh 364 (e.g., model parameters 355A) and the 3D image data 366 can be used to determine a loss 370A. In the first optimization stage 350A, the loss 370A can be based on a scan-to-mesh distance and a mesh-to-scan distance calculated based on Equations 1 and 2 above.

The loss 370A can be used by an optimizer 372 to calculate updated model parameters 374. The updated model parameters 374 can include optimized rotation and translation parameters. In some cases, the optimizer 372 can be a second order optimizer. In some examples, the optimizer 372 can implement an iterative method for solving unconstrained nonlinear optimization problems. For example, the optimizer 372 can implement BFGS or L-BFGS algorithm.

In some examples, the updated model parameters 374 can be used to update the model parameters 355A and/or can be input into the model 360 with the model parameters 355B to perform another optimization iteration for generating a mesh, determining a loss, and generating updated parameters. The first optimization stage 350A can include any number of iterations. For example, the first optimization stage 350A can include a single iteration or multiple iterations.

At the second optimization stage 350B, model parameters 380 are input into the model 360 to generate a mesh 382. The model parameters 380 can include rotation parameters, translation parameters, pose parameters, and shape parameters. In some examples, the mesh 382 can include a modified version of the mesh 364 generated in the first optimization stage 350A. For example, the mesh 382 can include a different pose and/or a different alignment to the 3D image data 366, The 3D image data 366 and the model parameters 380 of the mesh 364 can be used to determine a loss 370B. For example, the 3D image data 366 and the rotation, translation, pose, and shape parameters of the mesh 364 can be used to determine the loss 370B. In some examples, the loss 370B can be further based on additional parameters 384. In some examples, the additional parameters 384 can include Gaussian distribution parameters (e.g., mean and covariance) for a pose prior loss (e.g., a probabilistic loss that penalizes unlikely poses). In some cases, the additional parameters 384 can be camera intrinsic or camera extrinsic, depending on whether the 3D image data 366 includes camera image data or multi-view image data.

The loss 370B can be based on a scan-to-mesh distance and a mesh-to-scan distance calculated based on Equations 1 and 2 above. The loss 370B can also be based on a physical constraint loss, pose/shape regularization, and/or a pose prior loss, as previously described.

The loss 370B can be used by the optimizer 372 to calculate updated model parameters 390. The updated model parameters 390 can include optimized rotation parameters, translation parameters, pose parameters, and/or shape parameters. In some examples, the updated model parameters 390 can be used to update the model parameters 380 and/or can be input into the model 360 to perform another second stage optimization iteration for generating a mesh, determining a loss, and generating updated parameters. The second optimization stage 350B can include any number of iterations. For example, the second optimization stage 350B can include a single iteration or multiple iterations.

In some examples, the first optimization stage 350A and the second optimization stage 350B can be used to generate multiple mesh instances with different manipulations (e.g., different poses or rotations). For example, the first optimization stage 350A can be used to generate mesh instances 210, 212, 214 at the optimization stage 204 shown in FIG. 2, and to optimize the mesh instances 212 and 214 at a first optimization stage of the optimization stages 222 and 224 shown in FIG. 2. The second optimization stage 350B can be used to generate mesh result 230 at the second optimization stage 220 shown in FIG. 2, and to generate the mesh results 230, 232, 234 at a second optimization stage of the optimization stages 220, 222, 224 shown in FIG. 2.

Figure 4:
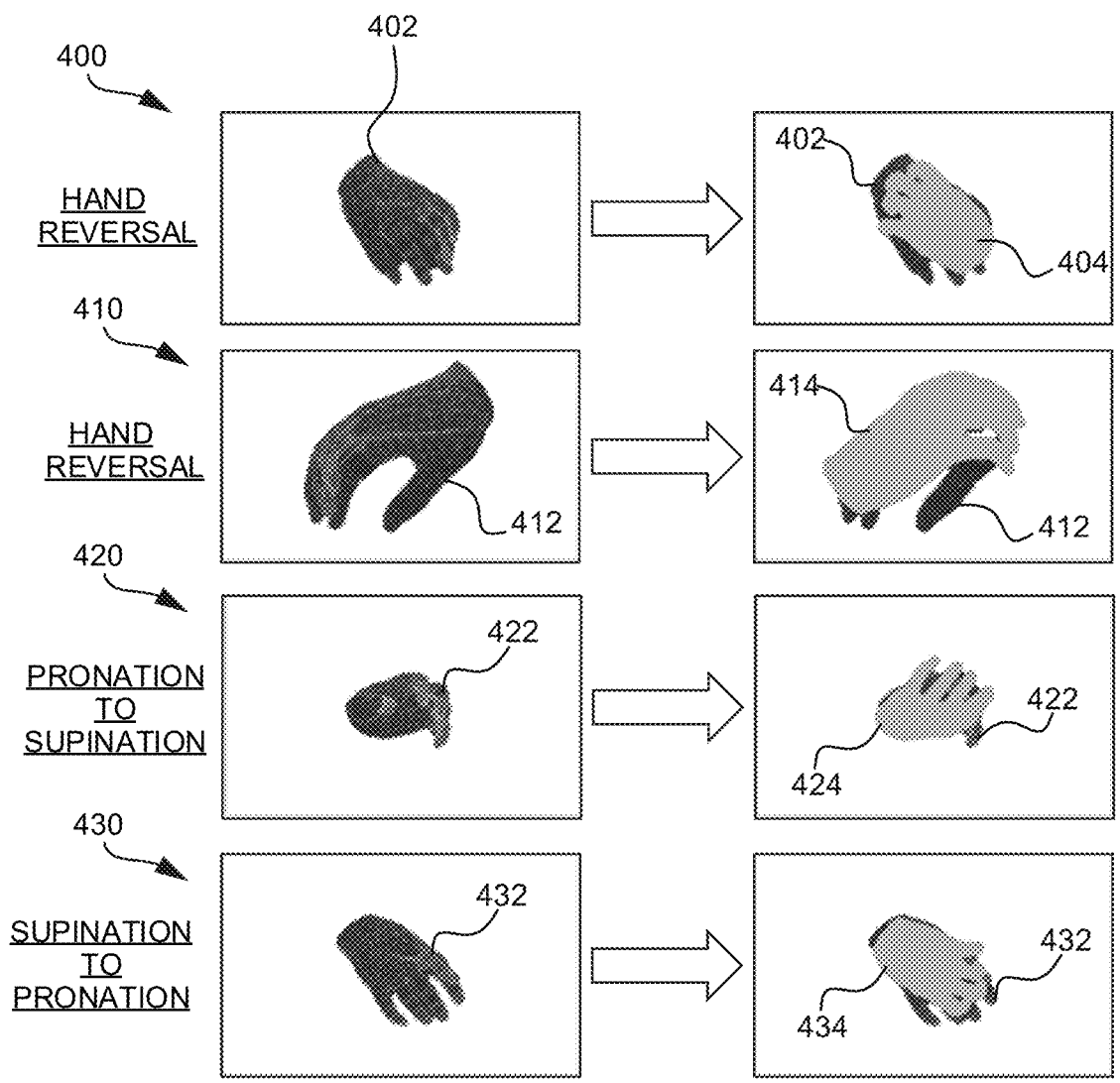
FIG. 4 is a diagram illustrating multiple example instantiations of a hand mesh model generated after an initial estimate of global translation and rotation parameters from a first optimization stage of a registration process, in accordance with some examples of the present disclosure.

FIG. 4 is a diagram illustrating multiple example instantiations of a hand mesh model generated after an initial estimate of global translation and rotation parameters from a first optimization stage (e.g., optimization stage 204, first optimization stage 350A). In this example, the hand mesh model instantiations include hand reversal instantiations 400 and 410, pronation to supination instantiations 420, and supination to pronation instantiations 430.

The hand reversal instantiations 400 show a hand mesh instance 402 generated after an initial estimate of global translation and rotation parameters. The hand mesh instance 402 is then reversed to generate hand mesh instance 404. In FIG. 4, hand mesh instance 404 is shown overlaid over hand mesh instance 402. As shown, the hand mesh instance 404 has been reversed (e.g., rotated) relative to the hand mesh instance 402, such that the fingers in the hand mesh instance 404 are facing an opposite direction as the fingers in the hand mesh instance 402.

The hand reversal instantiations 410 show another hand mesh instance 412 generated after an initial estimate of global translation and rotation parameters. The hand mesh instance 412 has a different global rotation (and optionally a different global translation) than the hand mesh instance 402 from the hand reversal instantiations 400. The hand mesh instance 412 can be similarly reversed to generate hand mesh instance 414. In FIG. 4, hand mesh instance 414 is shown overlaid over hand mesh instance 412. As shown, the hand mesh instance 414 has been reversed (e.g., rotated) relative to the hand mesh instance 412, such that the fingers in the hand mesh instance 414 are facing an opposite direction as the fingers in the hand mesh instance 412.

The pronation to supination instantiations 420 show another hand mesh instance 422 generated after an initial estimate of global translation and rotation parameters. The hand mesh instance 422 has a different global rotation (and optionally a different global translation) than both the hand mesh instances 402 and 412 from the hand reversal instantiations 400 and 410. The hand mesh instance 422 is in a pronate position. The hand mesh instance 422 can be rotated from the pronate position to generate hand mesh instance 424 in a supinate position. In FIG. 4, hand mesh instance 424 is shown overlaid over hand mesh instance 422. As shown, the hand mesh instance 424 has been supinated relative to the hand mesh instance 422, such that the palm in the hand mesh instance 424 is facing an upward direction as opposed to the palm in the hand mesh instance 422 which is facing a downward direction.

The supination to pronation instantiations 430 show another hand mesh instance 432 generated after an initial estimate of global translation and rotation parameters. The hand mesh instance 432 has a different global rotation (and optionally a different global translation) than the hand mesh instances 402, 412 and 422 from the hand reversal instantiations 400 and 410 and the pronation to supination instantiations 420. The hand mesh instance 432 is in a supinate position. The hand mesh instance 432 can be rotated from the supinate position to generate hand mesh instance 434 in a pronate position. In FIG. 4, hand mesh instance 434 is shown overlaid over hand mesh instance 432. As shown, the hand mesh instance 434 has been pronated relative to the hand mesh instance 432, such that the palm in the hand mesh instance 434 is facing a downward direction as opposed to the palm in the hand mesh instance 432 which is facing an upward direction.

In some examples, the hand mesh instances 402, 412, 422 and 432 can be generated in or after a first optimization stage (e.g., first optimization stage 350A). In some examples, the hand mesh instances 404, 414, 424, and 434 can be generated in or after any optimization stage (e.g., first optimization stage 350A, second optimization stage 350B). In some cases, the hand mesh instances 402, 412, 422, and 432 and the hand mesh instances 404, 414, 424, and 434 can be generated in or after a same optimization stage or any other optimization stage.

Multiple instantiations, such as the hand reversal instantiations 400 and 410, the pronation to supination instantiations 420, the supination to pronation instantiations 430, and/or other instantiations, can be used in a registration process to register a 3D mesh to 3D image data. For example, some or all of the instantiations in FIG. 4 can be implemented in the registration process 200 shown in FIG. 2.

The multiple instantiations used in a registration process can help improve a registration or alignment performance, can address the local minima problem in alignment, and can be robust to noise and occlusions in the input image data. Often, the number of vertices or points in the input 3D image data is arbitrary or unknown, and a correspondence between the vertices or points and parts of the target captured in the 3D image data may be unknown or cannot be directly learned. For example, the number of vertices or points in a 3D hand scan may be arbitrary. A system may not know or understand what part of the hand a particular vertex or point belongs to. Moreover, in many cases, the raw data in the 3D hand scan may be missing information, may have noise, etc. The multiple instantiations can implement different rotations and/or other manipulations which can be used in the registration process to address the foregoing challenges, improve the registration performance, and prevent the system from becoming stuck in the local minima.

Figure 5:
FIG. 5 illustrates another example registration process for registering 3D image data into a 3D mesh, in accordance with some examples of the present disclosure.

FIG. 5 is a diagram illustrating an example of different instantiations implemented in an example registration process. In this example, the model parameters 502 are used at the first optimization stage 510 to optimize rotation and translation parameters and generate different mesh instances 520, 522, 524, and 526. The different mesh instances 520, 522, 524, and 526 can have different rotation and/or translation parameters. The different mesh instances 520, 522, 524, and 526 are shown overlaid on the scanned object 575 captured by the 3D image data. As shown, the different mesh instances 520, 522, 524, and 526 have different orientations, translations, positions, and/or alignments relative to the scanned object 575.

The image processing system 100 can apply a second optimization stage 540 to the mesh instance 520 to generate a mesh result 550 based on the mesh instance 520. At the second optimization stage 540, the image processing system 100 can optimize at least some of the model parameters of the mesh instance 520. For example, the image processing system 100 can optimize the rotation, translation, pose, and/or shape parameters of the mesh instance 520 to generate the mesh result 550. As illustrated in FIG. 5, at the second optimization stage 220, the image processing system 100 can optimize (e.g., improve) the alignment of the mesh result 550 relative to the scanned object 575 as compared to the mesh instance 520.

The image processing system 100 can also apply first optimization stages 510 to the mesh instances 522, 524, 526.

At the first optimization stages 510, the image processing system 100 can optimize rotation and translation parameters of the mesh instances 522, 524, 526, and generate modified mesh instances 530, 532, 534 based on the optimized rotation and translation parameters.

The image processing system 100 can then apply second optimization stages 540 to the modified mesh instances 530, 532, 534. At the second optimization stages 540, the image processing system 100 can optimize rotation, translation and any other parameters of the mesh instances 530, 532, 534. For example, the image processing system 100 can optimize translation, rotation, shape, and pose parameters of the modified mesh instances 530, 532, 534. The image processing system can generate mesh results 552, 554, 556 (e.g., final mesh instances) based on the optimized parameters. In some examples, the optimization at the second optimization stages 540 can improve the alignment of some or all of the mesh results 552, 554, 556 relative to the scanned object 575 as compared to the modified mesh instances 530, 532, 534.

The image processing system 100 can select a final mesh instance 560 based on the mesh results 550, 552, 554, 556. To select the final mesh instance 560, the image processing system 100 can compute, for each mesh result, a distance between the mesh result and the scanned object 575 and select the mesh result with the minimum distance. For example, in some cases, the image processing system 100 can calculate a scan-to-mesh distance for the mesh results 550, 552, 554, 556, as previously described. The image processing system 100 can then select the mesh result having the minimum distance or the minimum average distance, as the final mesh instance 560. The final mesh instance 560 selected can include the final model parameters 570 determined for the scanned object 575.

Figure 6:
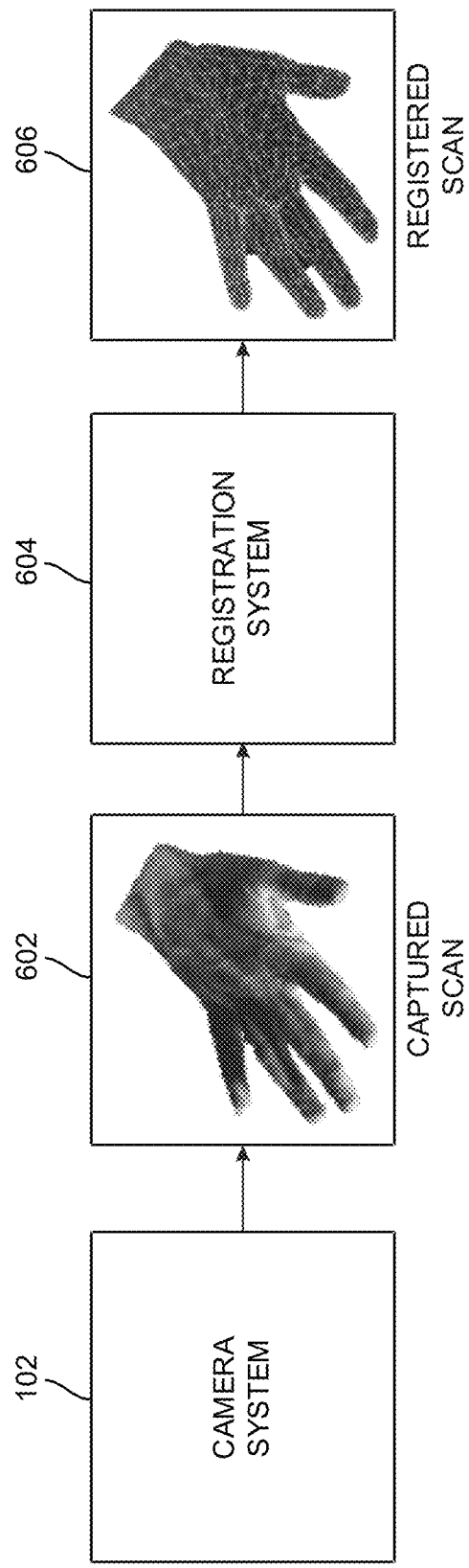
FIG. 6 is a diagram illustrating a high-level example of a registration process, in accordance with some examples of the present disclosure.

FIG. 6 is a diagram illustrating a high-level example of a registration process. As shown, the camera system 102 can generate a captured scan 602 of a 3D deformable object. A registration system 604 can receive the captured scan 602 and implement a registration process (e.g., registration process 200) with an optimization system (e.g., optimization system 300) to generate a registered scan 606 for the captured scan 602. The registered scan 606 can include a 3D mesh of the captured scan 602. The registered scan 606 can be aligned with the captured scan 602.

To generate the registered scan 606, the registration system 604 can implement multiple mesh instantiations using multiple optimization stages, as previously explained. The registration system 604 can select a mesh instantiation from the multiple mesh instantiations. The selected mesh instantiation can be the mesh instantiation determined to be the best fit (e.g., closest match, alignment, representation, etc.) for the captured scan 602. The selected mesh instantiation can be used for the registered scan 606.

Figure 7:
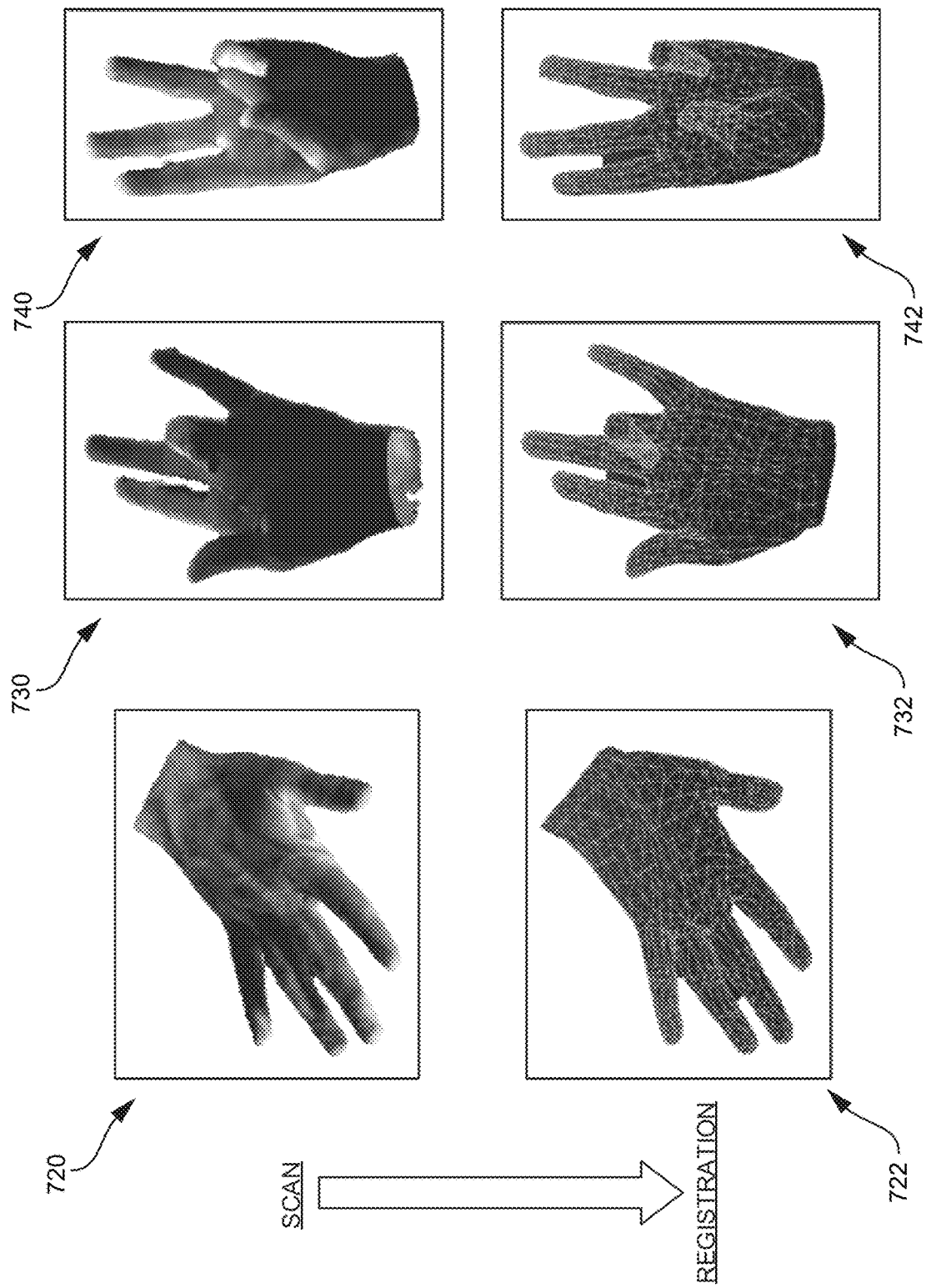
FIG. 7 is a diagram illustrating examples of 3D scanned objects and corresponding registrations, in accordance with some examples of the present disclosure.

FIG. 7 is a diagram illustrating examples of 3D scanned objects 720, 730, 740 and corresponding registrations 722, 732, 742. In this example, the 3D scanned objects 720, 730, 740 are hands with different poses and/or hand gestures. The corresponding registrations 722, 732, 742 are example registrations produced based on different respective instantiations and the registration and multi-stage optimization techniques described herein.

Here, 3D scan object 720 is a largely flat hand. The corresponding registration 722 is a 3D mesh of the largely flat hand. The 3D scan object 730 is a hand with the ring finger bent. The corresponding registration 732 is a 3D mesh which similarly has the ring bent. The 3D scan object 740 is a hand with three fingers up/extended, and the thumb and pinky fingers bent. The corresponding registration 742 is a 3D mesh which similarly has three fingers up/extended, and the thumb and pinky fingers bent.

Figure 8A:
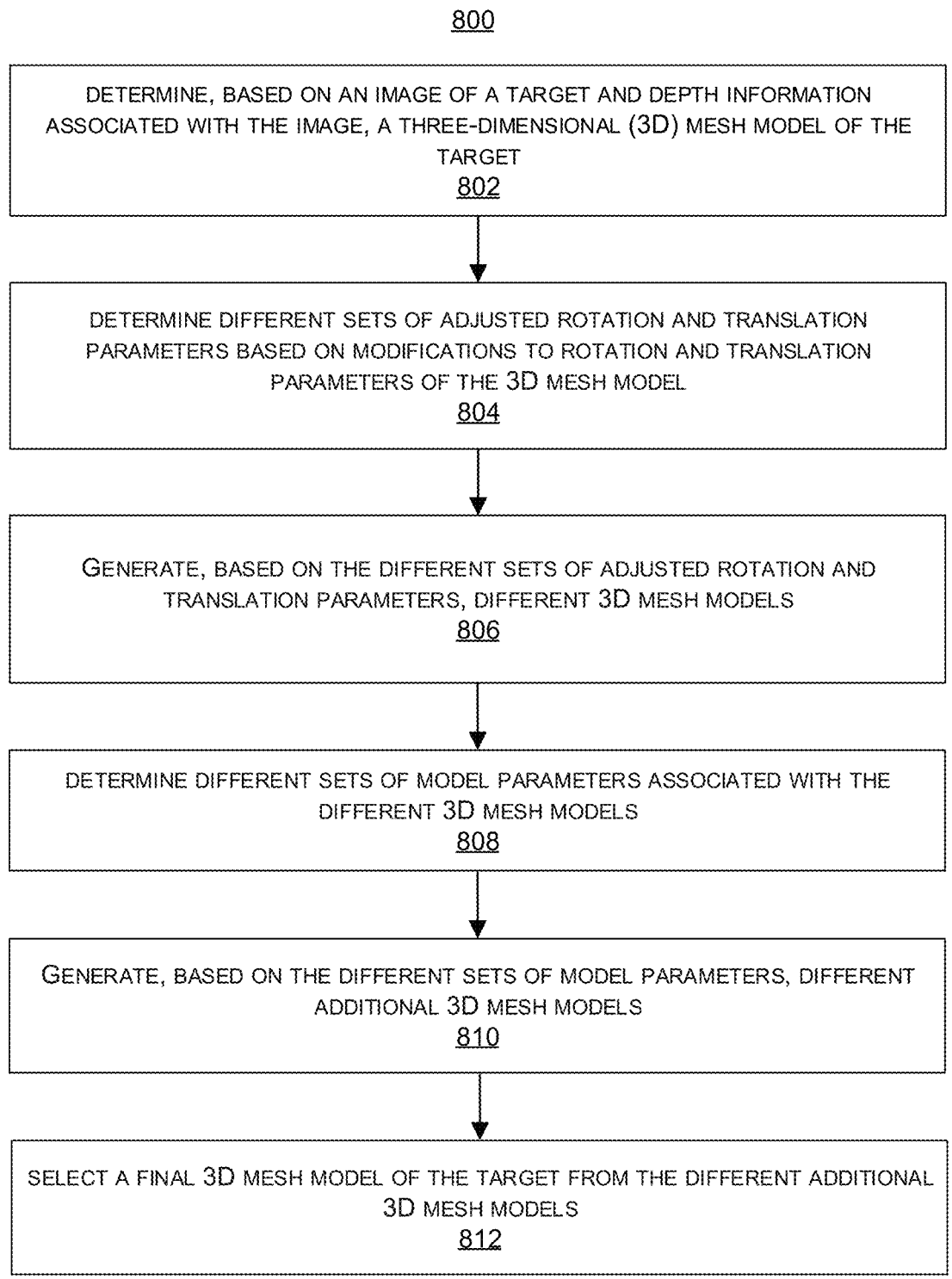

FIG. 8A is a flowchart illustrating an example process 800 for 3D image registration with deformable models. At block 802, the process 800 can include determining, based on an image of a target and depth information associated with the image (e.g., 3D image data 320), a 3D mesh model (e.g., 3D mesh 315) of a target.

In some examples, the image and the depth information can include a 3D image and/or a 3D scan. For example, the image and the depth information can include an RGB-D image or a 3D scan. In some examples, the 3D mesh can include a deformable model. In some examples, the target can include a deformable object and/or a deformable body. For example, the target can include a human, an animal, a body part, a manipulation robot, an articulated tool, etc. The deformable object and/or the deformable body can include an articulated object and/or body.

At block 804, the process 800 can include determining different sets of adjusted rotation and translation parameters (e.g., updated parameters 345, updated parameters 374). The different sets of adjusted rotation and translation parameters can be based on modifications (e.g., optimizations) to rotation and translation parameters of the 3D mesh model (e.g., rotation and translation parameters of the model parameters 305).

In some examples, determining the different sets of adjusted rotation and translation parameters can include determining an estimated loss (e.g., a scan-to-mesh loss and/or a mesh-to-scan loss) in the rotation and translation parameters of the 3D mesh model, and determining the different sets of adjusted rotation and translation parameters based at least partly on the estimated loss.

In some cases, determining the estimated loss in the rotation and translation parameters of the 3D mesh model can include determining, for each vertex in a 3D point cloud associated with the image and the depth information, a shortest distance of each vertex in the 3D point cloud to a surface formed by the 3D mesh model; determining a scan-to-mesh distance based on an average of the shortest distance of each vertex in the 3D point cloud; determining, for each vertex in the 3D mesh model, a shortest distance of each vertex in the 3D mesh model to a surface formed by the 3D point cloud; and determining a mesh-to-scan distance based on an average of the shortest distance of each vertex in the 3D mesh model. In some examples, a scan-to-mesh distance can be determined using Equation 1 above, and a mesh-to-scan distance can be determined using Equation 2 above.

At block 806, the process 800 can include generating, based on the different sets of adjusted rotation and translation parameters, different 3D mesh models (e.g., different mesh instances 520, 522, 524, 526). In some cases, generating the different 3D mesh models can include generating multiple manipulations and/or instantiations, such as instantiations 400, 410, 420, and/or 430 shown in FIG. 4. The different 3D mesh models can have different orientations, different poses, and/or different alignments relative to the target in the image. In some examples, the different 3D mesh models can include different rotation and/or translation parameters.

In some examples, generating the different 3D mesh models can include determining, based on the different sets of adjusted rotation and translation parameters, different orientations of the 3D mesh model, different poses of the 3D mesh model, and/or different alignments of the 3D mesh model relative to the target in the image; and generating different instances of the 3D mesh model. In some cases, each instance of the 3D mesh model can include a different orientation from the different orientations, a different pose from the different poses, and/or a different alignment from the different alignments.

At block 808, the process 800 can include determining different sets of model parameters (e.g., updated parameters 390) associated with the different 3D mesh models. The different sets of model parameters can be based on modifications (e.g., optimizations) to the different sets of adjusted rotation and translation parameters. In some examples, each set of model parameters from the different sets of model parameters can include different rotation parameters, different translation parameters, different pose parameters, and/or different shape parameters.

In some cases, each set of model parameters of the different sets of model parameters can be determined based on an estimated loss calculated for a set of adjusted rotation and translation parameters from the different sets of adjusted rotation and translation parameters. In some examples, the estimated loss can be based on a scan-to-mesh distance calculated for a respective 3D mesh model of the different 3D mesh models, a mesh-to-scan distance calculated for the respective 3D mesh model, a physical constraint loss, a pose prior loss, a pose regularization loss, and/or a shape regularization loss. In some examples, a scan-to-mesh distance can be determined using Equation 1 above, a mesh-to-scan distance can be determined using Equation 2 above, a physical constraint loss can be determined using Equation 3 above, a pose regularization loss can be determined using Equation 4 above, and a pose prior loss can be determined using Equation 5 above.

In some examples, the scan-to-mesh distance can include an average distance determined based on a shortest distance of each vertex in a 3D point cloud associated with the image and the depth information to a surface formed by the respective 3D mesh model. In some examples, the mesh-to-scan distance can include an average distance determined based on a shortest distance of each vertex in the respective 3D mesh model to a surface formed by the 3D point cloud.

In some cases, the physical constraint loss can be determined based on a range of pose parameters and/or shape parameters. In some cases, the pose regularization loss and/or the shape regularization loss can be proportional to a magnitude (e.g., L2 norm regularization) of the pose and/or shape parameters in order to restrain the pose and/or shape parameters from growing too large beyond certain and/or threshold numerical values. In some cases, the pose prior loss can be based on a probability score indicating a likelihood of a pose.

At block 810, the process 800 can include generating, based on the different sets of model parameters, different additional 3D mesh models (e.g., different mesh instances or results 550, 552, 554, 556). The different additional 3D mesh models can have different orientations, different poses, and/or different alignments relative to the target in the image. In some examples, the different additional 3D mesh models can have different rotation parameters, translation parameters, pose parameters, and/or shape parameters.

At block 812, the process 800 can include selecting a final 3D mesh model (e.g., final mesh 240, final mesh instance 560) of the target from the different additional 3D mesh models. In some examples, the final 3D mesh model can include a deformable model. In some cases, the final 3D mesh model can be selected based on a respective distance between a 3D point cloud associated with the image and the depth information and each particular 3D mesh model from the different additional 3D mesh models.

In some examples, the respective distance can include a respective scan-to-mesh distance. In some cases, the respective scan-to-mesh distance can include an average distance determined based on a shortest distance of each vertex in the 3D point cloud to a surface formed by a particular 3D mesh model. In some examples, the scan-to-mesh distance can be determined using Equation 1 above. In some cases, the final 3D mesh model can include the particular 3D mesh model having a shortest scan-to-mesh distance.

In some cases, selecting the final 3D mesh model can include aligning and/or fitting the final 3D mesh model to a 3D point cloud from the image and the depth information. The 3D point cloud can correspond to the target. For example, the 3D point cloud can be a point cloud scan of the target.

In some cases, the different sets of adjusted rotation and translation parameters can be determined at one or more first optimization stages (e.g., first optimization stage 350A), and the different sets of model parameters can be determined at one or more second optimization stages (e.g., second optimization stage 350B) performed after the one or more first optimization stages. In some examples, each set of adjusted rotation and translation parameters can be determined in a first optimization stage, and each set of model parameters from the different sets of model parameters is determined in a second optimization stage.

FIG. 8B is a flowchart illustrating another example process 820 for 3D image registration with deformable models. At block 822, the process 820 can include determining, based on an image of a target and depth information associated with the image (e.g., 3D image data 320), a 3D mesh model (e.g., 3D mesh 315) of a target.

In some examples, the image and the depth information can include a 3D image and/or a 3D scan. For example, the image and the depth information can include an RGB-D image or a 3D scan. In some examples, the 3D mesh can include a deformable model. In some examples, the target can include a deformable object and/or a deformable body. For example, the target can include a human, an animal, a body part, a manipulation robot, an articulated tool, etc. The deformable object and/or the deformable body can include an articulated object and/or body.

At block 824, the process 820 can include generating a set of modified 3D mesh models (e.g., different mesh instances or results 550, 552, 554, 556) based on one or more estimated losses in a plurality of rotation and translation parameters (e.g., rotation and translation parameters of the model parameters 305, updated parameters 345, updated parameters 374, updated parameters 390) associated with the 3D mesh model and/or different instances of the 3D mesh model (e.g., different mesh instances 520, 522, 524, 526).

In some examples, the set of modified 3D mesh models is generated based on different sets of model parameters (e.g., updated parameters 390) associated with the different instances of the 3D mesh model, and each set of model parameters from the different sets of model parameters can include different rotation parameters, different translation parameters, different pose parameters, and/or different shape parameters. In some cases, each set of model parameters of the different sets of model parameters can be determined based on an estimated loss of the one or more estimated losses calculated for a set of adjusted rotation and translation parameters (e.g., updated parameters 345, updated parameters 374) from different sets of adjusted rotation and translation parameters associated with the 3D mesh model. In some examples, the different sets of adjusted rotation and translation parameters can be based on modifications to rotation and translation parameters of the 3D mesh model.

In some cases, the estimated loss can be based on a scan-to-mesh distance calculated for a respective 3D mesh model of the different instances of the 3D mesh model, a mesh-to-scan distance calculated for the respective 3D mesh model, a physical constraint loss, a pose prior loss, a pose regularization loss, and/or a shape regularization loss. In some cases, the scan-to-mesh distance can include a first average distance determined based on a shortest distance of each vertex in a 3D point cloud associated with the image and the depth information to a first surface formed by the respective 3D mesh model, and the mesh-to-scan distance can include a second average distance determined based on a shortest distance of each vertex in the respective 3D mesh model to a second surface formed by the 3D point cloud. In some cases, the physical constraint loss can be determined based on a range of at least one of pose parameters and shape parameters, and the pose regularization loss and/or the shape regularization loss can be proportional to a magnitude of the pose parameters and/or the shape parameters. In some cases, the pose prior loss can be based on a probability score indicating a likelihood of a pose.

At block 826, the process 820 can include selecting a final 3D mesh model (e.g., final mesh 240, final mesh instance 560) of the target from the set of modified 3D mesh models. In some examples, the final 3D mesh model can include a deformable model. In some cases, the final 3D mesh model can be selected based on a respective distance between a 3D point cloud associated with the image and the depth information and each particular 3D mesh model from the set of modified 3D mesh models.

In some examples, the respective distance can include a respective scan-to-mesh distance. In some cases, the respective scan-to-mesh distance can include an average distance determined based on a shortest distance of each vertex in the 3D point cloud to a surface formed by a particular 3D mesh model. In some examples, the scan-to-mesh distance can be determined using Equation 1 above. In some cases, the final 3D mesh model can include the particular 3D mesh model having a shortest scan-to-mesh distance.

In some cases, selecting the final 3D mesh model can include aligning and/or fitting the final 3D mesh model to a 3D point cloud from the image and the depth information. The 3D point cloud can correspond to the target. For example, the 3D point cloud can be a point cloud scan of the target.

In some examples, the image and the depth information can include a 3D image and/or a 3D scan, and the final 3D mesh model can include a deformable model. In some cases, the target can include a deformable object and/or a deformable body.

In some examples, the process 820 can include determining different sets of adjusted rotation and translation parameters (e.g., updated parameters 345, updated parameters 374). The different sets of adjusted rotation and translation parameters can be based on an estimated loss from the one or more estimated losses and/or modifications (e.g., optimizations) to rotation and translation parameters (e.g., rotation and translation parameters of the model parameters 305) from the plurality of rotation and translation parameters. The rotation and translation parameters can correspond to the 3D mesh model. In some examples, the process 820 can include generating different 3D mesh models e.g., different mesh instances 520, 522, 524, 526) based on the different sets of adjusted rotation and translation parameters. The different 3D mesh models can have different orientations, different poses, and/or different alignments relative to the target in the image. In some cases, the different 3D mesh models can include the different instances of the 3D mesh model.

In some cases, the process 820 can include determining different sets of model parameters (e.g., updated parameters 390) associated with the different 3D mesh models. In some examples, the different sets of model parameters can be based on modifications (e.g., optimizations) to the different sets of adjusted rotation and translation parameters. In some examples, the set of modified 3D mesh models can be generated based on the different sets of model parameters associated with the different 3D mesh models.

In some cases, the different sets of adjusted rotation and translation parameters can be determined at one or more first optimization stages (e.g., first optimization stage 350A), and the different sets of model parameters can be determined at one or more second optimization stages (e.g., second optimization stage 350B). In some examples, each set of adjusted rotation and translation parameters can be determined in a first optimization stage, and each set of model parameters from the different sets of model parameters is determined in a second optimization stage.

In some examples, the process 820 can include determining the estimated loss from the one or more estimated losses. In some cases, determining the estimated loss can include determining, for each vertex in a 3D point cloud associated with the image and the depth information, a shortest distance of each vertex in the 3D point cloud to a surface formed by the 3D mesh model; determining a scan-to-mesh distance based on an average of the shortest distance of each vertex in the 3D point cloud; determining, for each vertex in the 3D mesh model, a shortest distance of each vertex in the 3D mesh model to a surface formed by the 3D point cloud; and determining a mesh-to-scan distance based on an average of the shortest distance of each vertex in the 3D mesh model.

In some examples, the process 820 can include determining, based on the different sets of adjusted rotation and translation parameters, different orientations of the 3D mesh model, different poses of the 3D mesh model, and/or different alignments of the 3D mesh model relative to the target in the image; and generating the different 3D mesh models. In some cases, each of the different 3D mesh models can include a different orientation from the different orientations, a different pose from the different poses, and/or a different alignment from the different alignments.

In some examples, the processes described herein (e.g., processes 200, 800, 820 and/or any other process described herein) may be performed by a computing device or apparatus. In one example, the process 800 and/or the process 820 can be performed by the image processing system 100 of FIG. 1. In another example, the process 800 and/or the process 820 can be performed by the computing system having the computing device architecture 900 shown in FIG. 9. For instance, a computing device with the computing device architecture 900 shown in FIG. 9 can implement the operations of FIG. 8A, FIG. 8B, and/or the components and/or operations described herein with respect to any of FIGS. 1 through 8B.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the processes 200, 800, 820, and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 200, 800 and 820 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 200, 800, 820 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 9 illustrates an example computing device architecture 900 of an example computing device which can implement various techniques described herein. For example, the computing device architecture 900 can implement at least some portions of the image processing system 100 shown in FIG. 1. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service (e.g., service 1 932, service 2 934, and service 3 936) stored in storage device 930 and configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device. In some instances, multimodal computing devices can enable a user to provide multiple types of input to communicate with the computing device architecture 900. The communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include service 932, service 934, and service 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. An apparatus comprising:
   memory; and
   one or more processors coupled to the memory, the one or more processors being configured to:
      determine, based on an image of a target and depth information associated with the image, a three-dimensional (3D) mesh model of the target, the 3D mesh model including a plurality of rotation and translation parameters;
      modify the plurality of rotation and translation parameters to generate modified rotation and translation parameters;
      generate different instances of the 3D mesh model using the modified rotation and translation parameters, each instance of the 3D mesh model from the different instances of the 3D mesh model including different rotation and translation parameters from the modified rotation and translation parameters;
      generate, for each instance of the different instances of the 3D mesh model, a respective modified 3D mesh model based on one or more estimated losses in a plurality of rotation and translation parameters associated with the 3D mesh model and respective rotation and translation parameters of each instance of the 3D mesh model from the different instances of the 3D mesh model; and
      select, based on the one or more estimated losses, a final 3D mesh model of the target from a set of modified 3D mesh models comprising each respective modified 3D mesh model for each instance of the different instances of the 3D mesh model.

2. The apparatus of claim 1, the one or more processors being configured to:
   determine different sets of adjusted rotation and translation parameters based at least partly on an estimated loss from the one or more estimated losses, the different sets of adjusted rotation and translation parameters being based on modifying the plurality of rotation and translation parameters from the plurality of rotation and translation parameters.

3. The apparatus of claim 2, wherein each instance of the 3D mesh model includes at least one of different orientations, different poses, or different alignments relative to the target in the image.

4. The apparatus of claim 2, wherein, to generate the different instances of the 3D mesh model, the one or more processors are configured to:
   determine, based on the different sets of adjusted rotation and translation parameters, at least one of different orientations of the 3D mesh model, different poses of the 3D mesh model, or different alignments of the 3D mesh model relative to the target in the image;
   wherein each instance of the different instances of the 3D mesh model comprises at least one of a different orientation from the different orientations, a different pose from the different poses, or a different alignment from the different alignments.

5. The apparatus of claim 1, wherein, to determine the one or more estimated losses, the one or more processors are configured to:
- determine, for each vertex in a 3D point cloud associated with the image and the depth information, a shortest distance of each vertex in the 3D point cloud to a surface formed by the 3D mesh model;
- determine a scan-to-mesh distance based on an average of the shortest distance of each vertex in the 3D point cloud;
- determine, for each vertex in the 3D mesh model, a shortest distance of each vertex in the 3D mesh model to a surface formed by the 3D point cloud; and
- determine a mesh-to-scan distance based on an average of the shortest distance of each vertex in the 3D mesh model.

6. The apparatus of claim 1, wherein the set of modified 3D mesh models is generated based on the different rotation and translation parameters from the modified rotation and translation parameters.

7. The apparatus of claim 1, wherein each respective rotation and translation parameters of each instance of the 3D mesh model from the different instances of the 3D mesh model is determined based on respective estimated loss of the one or more estimated losses calculated for a respective set of adjusted rotation and translation parameters from the modified rotation and translation parameters.

8. The apparatus of claim 7, wherein the estimated loss is based on at least one of a scan-to-mesh distance calculated for a respective 3D mesh model of the different instances of the 3D mesh model, a mesh-to-scan distance calculated for the respective 3D mesh model, a physical constraint loss, a pose prior loss, a pose regularization loss, and a shape regularization loss.

9. The apparatus of claim 8, wherein the scan-to-mesh distance comprises a first average distance determined based on a shortest distance of each vertex in a 3D point cloud associated with the image and the depth information to a first surface formed by the respective 3D mesh model, and wherein the mesh-to-scan distance comprises a second average distance determined based on a shortest distance of each vertex in the respective 3D mesh model to a second surface formed by the 3D point cloud.

10. The apparatus of claim 8, wherein the physical constraint loss is determined based on a range of at least one of pose parameters and shape parameters, and wherein at least one of the pose regularization loss and the shape regularization loss is proportional to a magnitude of at least one of the pose parameters and the shape parameters.

11. The apparatus of claim 8, wherein the pose prior loss is based on a probability score indicating a likelihood of a pose.

12. The apparatus of claim 1, wherein the final 3D mesh model is selected based on a respective distance between a 3D point cloud associated with the image and the depth information and each particular 3D mesh model from the set of modified 3D mesh models.

13. The apparatus of claim 12, wherein the respective distance comprises a respective scan-to-mesh distance, wherein the respective scan-to-mesh distance comprises an average distance determined based on a shortest distance of each vertex in the 3D point cloud to a surface formed by a particular 3D mesh model, and wherein the final 3D mesh model comprises the particular 3D mesh model having a shortest scan-to-mesh distance.

14. The apparatus of claim 1, wherein the image and the depth information comprise at least one of a 3D image and a 3D scan, wherein the final 3D mesh model comprises a deformable model, and wherein the target comprises at least one of a deformable object and a deformable body.

15. The apparatus of claim 1, wherein, to select the final 3D mesh model, the one or more processors are configured to at least one of align and fit the final 3D mesh model to a 3D point cloud from the image and the depth information, the 3D point cloud corresponding to the target.

16. The apparatus of claim 1, the one or more processors being configured to generate the different instances of the 3D mesh model, wherein the plurality of rotation and translation parameters corresponds to the different instances of the 3D mesh model, and wherein the set of modified 3D mesh models is generated based on modifications to the plurality of rotation and translation parameters of the different instances of the 3D mesh model.

17. The apparatus of claim 1, wherein the apparatus comprises at least one of camera device and a mobile device.

18. A method comprising:
- determining, based on an image of a target and depth information associated with the image, a three-dimensional (3D) mesh model of the target, the 3D mesh model including a plurality of rotation and translation parameters;
- modifying the plurality of rotation and translation parameters to generate modified rotation and translation parameters;
- generating different instances of the 3D mesh model using the modified rotation and translation parameters, each instance of the 3D mesh model from the different instances of the 3D mesh model including different rotation and translation parameters from the modified rotation and translation parameters;
- generating, for each instance of the different instances of the 3D mesh model, a respective modified 3D mesh model based on one or more estimated losses in a plurality of rotation and translation parameters associated with the 3D mesh model and respective rotation and translation parameters of each instance of the 3D mesh model from the different instances of the 3D mesh model; and
- selecting, based on the one or more estimated losses, a final 3D mesh model of the target from a set of modified 3D mesh models comprising each respective modified 3D mesh model for each instance of the different instances of the 3D mesh model.

19. The method of claim 18, further comprising:
- determining different sets of adjusted rotation and translation parameters based at least partly on an estimated loss from the one or more estimated losses, the different sets of adjusted rotation and translation parameters being based on modifying the plurality of rotation and translation parameters from the plurality of rotation and translation parameters.

20. The method of claim 19, wherein each instance of the 3D mesh model includes at least one of different orientations, different poses, or different alignments relative to the target in the image.

21. The method of claim 19, wherein generating the different instances of the 3D mesh model comprises:
- determining, based on the different sets of adjusted rotation and translation parameters, at least one of different orientations of the 3D mesh model, different poses of the 3D mesh model, or different alignments of the 3D mesh model relative to the target in the image;
- wherein each instance of the different instances of the 3D mesh model comprises at least one of a different orientation from the different orientations, a different pose from the different poses, or a different alignment from the different alignments.

22. The method of claim 18, further comprising determining the estimated loss from the one or more estimated losses, wherein determining the estimated loss comprises:
determining, for each vertex in a 3D point cloud associated with the image and the depth information, a shortest distance of each vertex in the 3D point cloud to a surface formed by the 3D mesh model;
determining a scan-to-mesh distance based on an average of the shortest distance of each vertex in the 3D point cloud;
determining, for each vertex in the 3D mesh model, a shortest distance of each vertex in the 3D mesh model to a surface formed by the 3D point cloud; and
determining a mesh-to-scan distance based on an average of the shortest distance of each vertex in the 3D mesh model.

23. The method of claim 18, wherein the set of modified 3D mesh models is generated based on the different rotation and translation parameters from the modified rotation and translation parameters.

24. The method of claim 18, wherein each respective rotation and translation parameters of each instance of the 3D mesh model from the different instances of the 3D mesh model is determined based on respective estimated loss of the one or more estimated losses calculated for a respective set of adjusted rotation and translation parameters from the modified rotation and translation parameters.

25. The method of claim 24, wherein the estimated loss is based on at least one of a scan-to-mesh distance calculated for a respective 3D mesh model of the different instances of the 3D mesh model, a mesh-to-scan distance calculated for the respective 3D mesh model, a physical constraint loss, a pose prior loss, a pose regularization loss, and a shape regularization loss.

26. The method of claim 25, wherein the scan-to-mesh distance comprises a first average distance determined based on a shortest distance of each vertex in a 3D point cloud associated with the image and the depth information to a first surface formed by the respective 3D mesh model, and wherein the mesh-to-scan distance comprises a second average distance determined based on a shortest distance of each vertex in the respective 3D mesh model to a second surface formed by the 3D point cloud.

27. The method of claim 25, wherein the physical constraint loss is determined based on a range of at least one of pose parameters and shape parameters, wherein at least one of the pose regularization loss and the shape regularization loss is proportional to a magnitude of at least one of the pose parameters and the shape parameters, and wherein the pose prior loss is based on a probability score indicating a likelihood of a pose.

28. The method of claim 18, wherein the final 3D mesh model is selected based on a respective distance between a 3D point cloud associated with the image and the depth information and each particular 3D mesh model from the set of modified 3D mesh models, wherein the respective distance comprises a respective scan-to-mesh distance, and wherein the final 3D mesh model comprises the particular 3D mesh model having a shortest scan-to-mesh distance.

29. The method of claim 18, wherein the final 3D mesh model comprises a deformable model, wherein the target comprises at least one of a deformable object and a deformable body, and wherein selecting the final 3D mesh model comprises at least one of aligning and fitting the final 3D mesh model to a 3D point cloud from the image and the depth information, the 3D point cloud corresponding to the target.

30. A non-transitory computer-readable medium having stored thereon instructions which, when executed by one or more processors, cause the one or more processors to:
determine, based on an image of a target and depth information associated with the image, a three-dimensional (3D) mesh model of the target, the 3D mesh model including a plurality of parameters rotation and translation parameters;
modify the plurality of rotation and translation parameters to generate modified rotation and translation parameters;
generate different instances of the 3D mesh model using the modified rotation and translation parameters, each instance of the 3D mesh model from the different instances of the 3D mesh model including different rotation and translation parameters from the modified rotation and translation parameters;
generate, for each instance of the different instances of the 3D mesh model, a respective modified 3D mesh model based on one or more estimated losses in a plurality of rotation and translation parameters associated with the 3D mesh model and respective rotation and translation parameters of each instance of the 3D mesh model from the different instances of the 3D mesh model; and
select, based on the one or more estimated losses, a final 3D mesh model of the target from a set of modified 3D mesh models comprising each respective modified 3D mesh model for each instance of the different instances of the 3D mesh model.

* * * * *